(12) United States Patent
Kobayashi et al.

(10) Patent No.: US 8,635,775 B2
(45) Date of Patent: Jan. 28, 2014

(54) PROCESS FOR MANUFACTURING A BEARING RING MEMBER AS A CONSTITUENT OF A ROLLING BEARING UNIT FOR WHEEL SUPPORT

(75) Inventors: Kazuto Kobayashi, Fujisawa (JP); Yuu Yasuda, Fujisawa (JP); Kiyoshi Ootsuka, Fujisawa (JP)

(73) Assignee: NSK, Ltd., Tokyo (JP)

( * ) Notice: Subject to any disclaimer, the term of this patent is extended or adjusted under 35 U.S.C. 154(b) by 1162 days.

(21) Appl. No.: 12/096,725

(22) PCT Filed: Dec. 5, 2006

(86) PCT No.: PCT/JP2006/324216
§ 371 (c)(1),
(2), (4) Date: Sep. 23, 2009

(87) PCT Pub. No.: WO2007/066634
PCT Pub. Date: Jun. 14, 2007

(65) Prior Publication Data
US 2010/0011582 A1    Jan. 21, 2010

(30) Foreign Application Priority Data
Dec. 8, 2005   (JP) .................... 2005-354469

(51) Int. Cl.
*B21K 1/40*   (2006.01)
(52) U.S. Cl.
USPC ............ 29/894.36; 29/898; 29/898.066; 29/898.06; 384/544
(58) Field of Classification Search
USPC .............. 29/898, 898.066, 894.36, 898.06; 384/544
See application file for complete search history.

(56) References Cited

U.S. PATENT DOCUMENTS

| | | | |
|---|---|---|---|
| 4,799,631 A * | 1/1989 | Humphries et al. | 244/118.5 |
| 7,270,297 B2 * | 9/2007 | Schaefer et al. | 244/137.1 |
| 7,891,879 B2 * | 2/2011 | Hirai et al. | 384/544 |
| 7,921,512 B2 * | 4/2011 | Michel | 16/96 R |
| 8,402,661 B2 * | 3/2013 | Kobayashi et al. | 29/898.066 |
| 8,424,205 B2 * | 4/2013 | Kobayashi et al. | 29/894.36 |
| 2001/0046339 A1 | 11/2001 | Miyazaki et al. | |
| 2004/0218365 A1 | 11/2004 | Hashimoto | |

FOREIGN PATENT DOCUMENTS

| | | |
|---|---|---|
| JP | 1-241351 A | 9/1989 |
| JP | 1-262037 A | 10/1989 |
| JP | 11-129703 A | 5/1999 |
| JP | 2003-25803 A | 1/2003 |
| JP | 2003-291604 A | 10/2003 |
| JP | 2004-74815 A | 3/2004 |
| JP | 2004-298585 A | 10/2004 |
| JP | 2004-335534 A | 11/2004 |

OTHER PUBLICATIONS

International Search Report dated Mar. 6, 2007 with English translation (Two (2) pages).

* cited by examiner

*Primary Examiner* — Richard Chang
(74) *Attorney, Agent, or Firm* — Crowell & Moring LLP

(57) ABSTRACT

This invention provided a manufacturing method to process a small-diameter step section 18 on an inside end section of a hub body 13a that comprises an outward facing flange 15 and a positioning cylinder 16 stably and with high precision. In this invention, an intermediate material 40 is pressed between a lower punch 36 and an upper punch 46 with an outer peripheral surface of the intermediate material 40 being held by a lower die 37 and an upper die 43, and then a part of the intermediate material 40 is pressed into the lower punch 36 such that the small-diameter step section 18 is formed by cold plastic working.

15 Claims, 20 Drawing Sheets

PROCESS FOR MANUFACTURING A BEARING RING MEMBER AS A CONSTITUENT OF A ROLLING BEARING UNIT FOR WHEEL SUPPORT

FIELD OF THE INVENTION

The present invention relates to a process for manufacturing a bearing ring member of a rolling bearing unit for wheel support.

BACKGROUND OF THE INVENTION

The wheel 1 of an automobile, and the rotor 2, which is a rotating member for braking of a disc brake as a braking apparatus, are supported so that they rotate freely by the knuckle 3 of a suspension apparatus using construction as shown in FIG. 8. That is, the outer ring 6 of a hub unit 5 for wheel support is fastened to the circular support holes 4 that are formed in this knuckle 3 by a plurality of bolts 7. On the other hand, the wheel 1 and rotor 2 are connected and fastened to the hub 8 of this hub unit 5 for wheel support by plurality of studs 9 and nuts 10. In addition, a double row of outer raceways 11a, 11b are formed around the inner peripheral surface of the outer ring 6, and a connection flange 12 is formed around the outer peripheral surface of this outer ring 6. This kind of outer ring 6 is fastened to the knuckle 3 by connecting the connection flange 12 to the knuckle 3 with the bolts 7.

The hub 8 comprises a hub body 13 and an inner ring 14. An outward facing mounting flange 15 is formed on part of the outer peripheral surface of the hub body 13, which is the bearing ring member of a rolling bearing unit for wheel support that is the target of the manufacturing process of the present invention, in the section that protrudes from the opening on the outside end of the outer ring 6. The 'outside' in the axial direction is the outside in the width direction of the vehicle when installed in the automobile, and is the left side in FIG. 18 and FIG. 19. Conversely, the 'inside' in the axial direction is the middle in width direction of the vehicle with installed in the automobile, and is the right side in FIG. 18 and FIG. 19. A positioning cylinder 16 called a pilot section is located on the outside end of the hub body 13 so that it is concentric with the hub body 13. The wheel 1 and rotor 2 are positioned in the radial direction by fitting them around this positioning cylinder 16, and connected and fastened to the outside surface of the mounting flange 15 by the studs 9 and nuts 10.

An inner raceway 17a is formed around the large-diameter middle section 26 of the cylindrical surface section that is formed around the middle part of the outer peripheral surface of the hub body 13 so that it faces the outside outer raceway 11a of the double row of outer raceways 11a, 11b; and similarly a small-diameter step section 18 is formed around the small-diameter section of the cylindrical surface section. This small-diameter step section 18, the middle section 26 and the step surface 31 that exists between these two sections 18, 26 form a stepped section. Also, the inner ring 14 fits around the small-diameter step section 18 of these sections. An inner raceway 17b is formed around the outer peripheral surface of this inner ring 14 so that it faces the inside outer raceway 11b of the double row of outer raceways 11a, 11b. This kind of inner ring 14 is fastened to the hub body 13 by a crimped section 19 that is formed by plastically deforming the inside end section of the hub body 13 outward in the radial direction. A plurality of rolling bodies 20 is located between each pair of outer raceways 11a, 11b and inner raceways 17a, 17b so that they roll freely. In the example shown in the figures, balls are used as the rolling bodies 20, however, in the case of a hub unit for a heavy automobile, conical rollers may be used. The openings on both ends of the cylindrical space where the rolling bodies are located are sealed by seal rings 21a, 21b.

Furthermore, the example shown in the figures is a hub unit 5 for wheel support for drive wheels (the front wheels in the case of FF wheels, rear wheels in the case of FR and RR wheels, and all of the wheels in the case of 4WD wheels), so a spline hole 22 is formed in the center section of the hub 8. A spline shaft 24 that is formed on the outside end surface of the outer ring 23 of a constant-velocity joint is inserted into this spline hole 22. Together with this, a nut 25 is screwed onto the tip end of the spline shaft 24, and by tightening the nut 25, the hub body 13 is held between the nut 2 and the outer ring 23 of the constant-velocity joint.

Next, FIG. 19 shows a second example of a conventional hub unit 5a for wheel support, and is a hub unit for undriven wheels (rear wheels in the case of FF wheels, and front wheels in the case of FR and RR wheels). This second example of a hub unit 5a for wheel support is for undriven wheels, so a spline hole is not formed in the center section of the hub body 13a of the hub 8a. In the example shown in this figure, the inside end surface of the inner ring 14 is held by a crimped section 19 that is formed on the inside end section of the hub body 13a. This inside end surface of the inner ring can also be held by a nut that is screwed onto the inside end section of the hub body 13a. In that case, a male screw section is formed on the inside end section of the hub body 13a for screwing the nut onto. The construction and function of the other parts are the same as in the case of the hub unit 5 for wheel support described in the first example.

Incidentally, in the case of each of the hub units 5, 5a for wheel support described above, the construction of each is such that around the outer peripheral surface of the hub body 13, 13a, from the outside end side there is a positioning cylinder section 16, a middle section 26 for the outside outer raceway 17a, and a small-diameter step section 18 onto which the inner ring 14 is fitted. Besides plastic working such as hot forging or cold forging, cutting can be considered as the method for processing each of these sections. However, in order to improve processibility, maintain material yield and reduce costs, it is preferable that plastic working be performed. Moreover, of the types of plastic working, hot forging is capable of processing the object being processed in a soft state, so even though the formation load can be kept small, when taking into consideration the differences in thermal expansion, it is necessary to increase the fitting tolerance of the receiving and pressing molds, and it is difficult to maintain the precision of the shape and dimensions of the processed goods. Furthermore, in the case of hot forging, a decarburized layer occurs on the surface, so when there is a portion whose surface must be hardened by thermal processing, it is necessary to perform cutting in order to remove the decarburized layer. The machining allowance for the cutting process is somewhat large, so not only is the processibility reduced due to this cutting, but also the material yield becomes poor, which causes an increase in the processing cost of the hub body 13, 13a.

Therefore, even though hot forging can be used for processing the aforementioned positioning cylinder 16 or mounting flange 15, when cost is taken into consideration, it cannot be used for processing the small-diameter step section 18. The reason for this is that the inner ring 14 must be securely fitted around this small-diameter step section 18 by an appropriate interference fit and the dimensions must be very precise, and to prevent the occurrence of fletching wear on the surface that fits with the inner ring 14, and form a quenched hardened layer on the surface. When these reasons are taken into consideration, the small-diameter step section 18 is formed by cold plastic working or cutting (turning). Of these, cutting produces a highly precise small-diameter step section 18, however increases the cost.

On the other hand, it is feasible to process the small-diameter step section 18 by ironing, which is a type of cold forging. In this case, as shown in (A) of FIG. 20, the material 27 to be processed into the hub body is pressed into a die 29 by a punch 28, and as shown in (B) of the same figure, the small-diameter step section 18 is formed on the tip end in the direction of pressing of the material 27. However, in order to process this small-diameter step section 18 by this kind of ironing process, the difference between the outer diameter $D_B$ of the material before being pressed into the die 29 and the outer diameter $D_A$ after being pressed ($D_B - D_A$) must be small, and the approach angle $\theta$ to the die 29 must be small. When either condition is not satisfied, the material 27 cannot be pressed into the die 29. More specifically, as shown in (C) of FIG. 20, the material 27 is not pressed into the die 29 and is compressed in the axial direction. Therefore, using conventional methods, it is difficult to process the small-diameter step section 18 with cold forging.

Japanese Patent Application Publication Nos. 2003-25803, 2003-291604 and 2004-74815 disclose inventions related to the structure of a hub comprising a positioning cylinder, mounting flange, middle section and small-diameter step section. However, all of the inventions disclosed in these patent applications are related to the structure of a hub for which it is easy to process or install the positioning cylinder or mounting flange, however do not suggest techniques that make it possible to process the small-diameter step section on the inside end of the hub by cold forging.

SUMMARY OF THE INVENTION

Taking the aforementioned problems into consideration, it is the object of the present invention to provide a manufacturing method by which it is possible to process a small-diameter step section on the inside end section of the hub body that comprises an outward facing flange and positioning cylinder section stably and with high precision.

The bearing ring member of a rolling bearing unit for wheel support that is the object of the manufacturing method of this invention comprises an outward facing flange, a positioning cylinder and a step section.

Of these, the outward facing flange is formed around a part of an outer peripheral surface of the bearing ring member.

Moreover, the positioning cylinder is formed on one side in the axial direction of the outward facing flange.

Furthermore, the step section is formed around the outer peripheral surface of the side of the outward facing flange that is opposite in the axial direction from the positioning cylinder, and it comprises a large diameter section on near the side of the outward facing flange, and a small diameter section on the far side from the outward facing flange.

In order to manufacture this kind of bearing ring member, in the process for manufacturing a bearing ring member of a rolling bearing unit for wheel support of the present invention, first, a metallic material for making this bearing ring member is prepared that comprises at least a cylindrical surface section having an outer diameter that matches the outer diameter of the large-diameter section of the step section. Here, it is not absolutely necessary that both of these outer diameters match perfectly. Taking into consideration the small amount of deformation that occurs during processing, it is allowable for them to practically match.

Without heating the metallic material, or in other words, in a cold state, the tip end surface of the cylindrical surface section, which is the surface opposite from the outward facing flange, is brought into contact with a receiving punch that has an inner diameter that matches the outer diameter of the small-diameter section. At the same time, at least a part of the outer peripheral surface of the cylindrical surface section is supported by an inner peripheral surface of a floating die, which is supported such that it is capable of moving in the axial direction of the cylindrical surface section, and it is in a state of having an elastic force applied to it in the direction toward the outward facing flange. Next, with at least the part of the outer peripheral surface of the cylindrical surface section supported by the inner peripheral surface of the floating die, a base end surface of the metallic material, which is the surface on the side opposite the surface that is in contact with the receiving punch, is pressed toward the receiving punch by a pressing punch. That part of the cylindrical surface section is pressed into the receiving punch to form the small diameter section by cold plastic working.

A feature of the present invention is that, as described above, processing of the small-diameter section is perform at low cost and with high precision, and processing of this small-diameter section is performed by cold forging using floating dies. When performing the process of the present invention, it does not matter whether the work of processing the small-diameter section is performed before or after the work of forming the outward facing flange and positioning cylinder.

For example, it is possible to use an intermediate material, which is a metallic material, on which the outward facing flange and positioning cylinder have been formed beforehand. In this case, the work of pressing part of the cylindrical surface section of this intermediate material by the pressing punch into the receiving punch is performed with the surfaces of the outward facing flange and positioning cylinder being held by a second floating die that is separate from the floating die that holds the outer peripheral surface of the cylindrical surface section and that moves in the axial direction together with this floating die.

It is also possible to use a material, which is a metallic material, on which the outward facing flange and positioning cylinder have not yet been formed, and of which at least a part in the axial direction has a circular column shape. In this case, after this material is formed into an intermediate material by processing a part of the outer peripheral surface of die material into a small diameter section while holding it by a floating die, the outward facing flange and positioning cylinder are formed around the remaining part of the outer peripheral surface of this intermediate material.

Moreover, when embodying the present invention, it is also possible, for example, for the present invention to comprise a flange finishing process for finishing the thickness dimension of the outward facing flange. In this flange finishing process, the thickness dimension of the outward facing flange is reduced by performing a upsetting process on the outward facing flange to press and plastically deform a part of the outward facing flange that includes the base section in the axial direction.

It is also possible to comprise a cylinder finishing process for finishing the outer diameter of the positioning cylinder. In this cylinder finishing process, the outer diameter of a rough cylinder is reduced to form the positioning cylinder by performing a cold ironing process on this rough cylinder having an outer diameter that is greater than the diameter after finishing. It is also possible to increase the inner diameter of the rough cylinder having an inner diameter that is less than the diameter after finishing.

EFFECT OF THE INVENTION

With the process for manufacturing a bearing ring member of a rolling bearing unit for wheel support of the present invention that is constructed as described above, it is possible to process, for example, a small-diameter section such as a small-diameter step section on the inside end section of a hub flat comprises an outward facing flange and positioning cylinder stably and with high precision.

That is, this small-diameter section is processed by cold forging, so it is possible to improve the precision of dimensions by keeping errors in dimensions due to differences in thermal expansion of the molds and object being processed (metal material) to a minimum. In addition, since the object being processed, which is a metallic material, is pressed into a receiving punch by a pressing punch with the outer peripheral surface of the metallic material being held by a floating die, the metallic material does not deform outward in the radial direction as shown in (C) of FIG. 20 described above. Therefore, the aforementioned small-diameter section can be processed stably even though there may be a large difference between the outer diameter of the metallic material and the outer diameter of the small-diameter section (there is a large rate of decrease of the cross-sectional area) or when the slope of the step section that connects between the small-diameter section and the remaining portion is large (the angle of the step section with respect to the center axis is a right angle or nearly a right angle).

Moreover, with the process for manufacturing a bearing ring member of a rolling bearing unit for wheel support of the present invention, it does not matter whether processing of the small-diameter section is performed before or after processing of the outward facing flange and positioning cylinder. Therefore, it is possible to process the outward facing flange and positioning cylinder, which requires a large amount of processing, by hot forging before processing the small diameter section. Also, it is possible to form the outward facing flange and positioning cylinder cold by dividing the performance of a upsetting process, which is a form of forging, into a plurality of times. It is also possible to form the outward facing flange cold by performing a side extrusion process, which is a form of forging. Furthermore, it is possible to form the outward facing flange and positioning cylinder by combining the upsetting process and side extrusion process. In either method used, processing of the outward facing flange and positioning cylinder can be performed easily with good yield while keeping the possibility of damage such as cracking to a minimum.

Processing of the outward facing flange and positioning cylinder can also be performed after processing the small-diameter section. In that case, processing of the outward facing flange and positioning cylinder is performed by cold forging as described above. In any case it is possible to freely set the order of processing of each part, making it possible to improve the load balance inside the processing equipment, which is useful from the aspect of maintaining processing precision and maintaining the durability of the processing equipment.

By comprising a finishing process for bringing the thickness dimension of the outward facing flange to the proper dimension by upsetting, or by comprising a cylinder finishing process for bringing the inner and outer diameters of the positioning cylinder to the proper values by ironing, it is possible to form the outward facing flange and positioning cylinder at low cost while improving the precision of shape and dimensions. In other words, by shortening the process cycle and improving the material yield by performing the aforementioned upsetting process or ironing process, it is possible to lower the cost of the finishing process more than with a tuning process, which is typically performed to improve the shape and dimension precision. Also, it is possible to improve the strength (hardness) of the processed parts by work hardening.

DESCRIPTION OF THE PREFERRED EMBODIMENTS

First Embodiment

Figure 1:
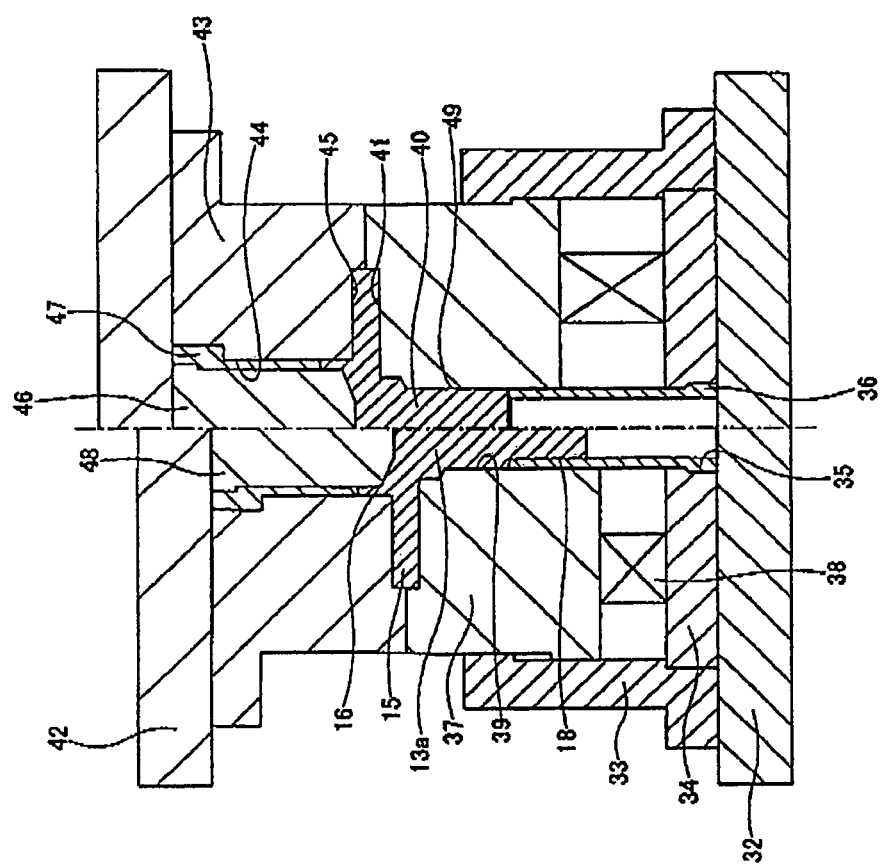
FIG. 1 is a cross-section drawing showing a first embodiment of the present invention.
Figure 19:
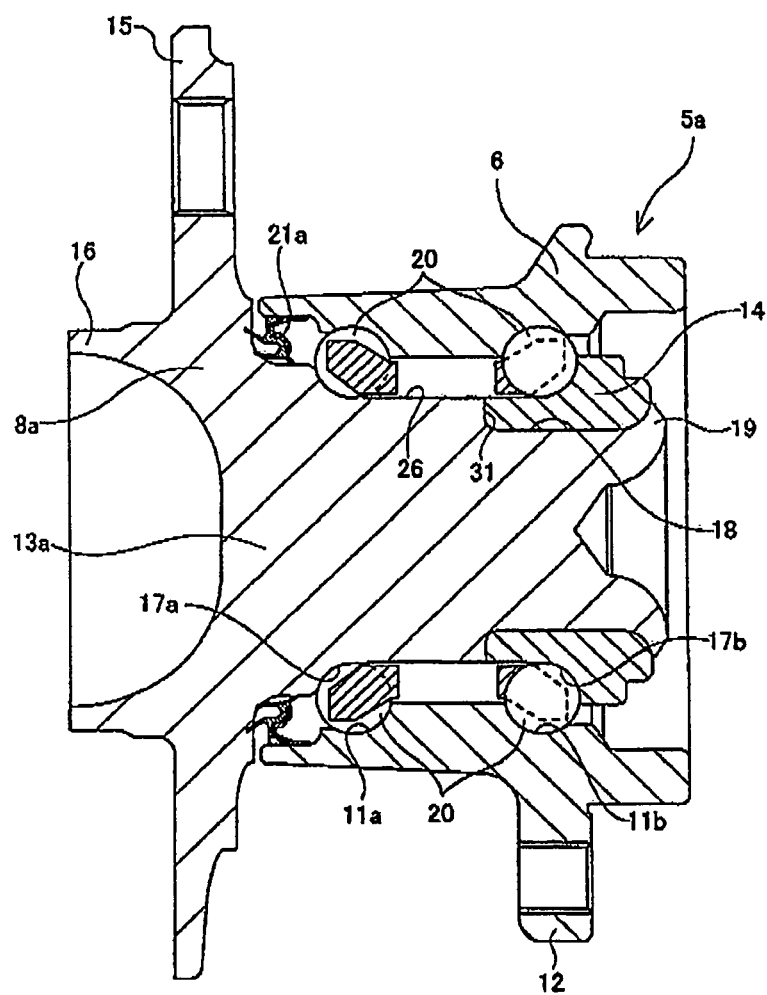
FIG. 19 is a cross-section drawing showing an example of a hub unit for wheel support of undriven wheels.

FIG. 1 shows a first embodiment of the present invention. The purpose of this embodiment is the manufacture of a hub body (bearing ring member) 13a of a rolling bearing unit for wheel support for undriven wheels as shown in FIG. 19 described above. In FIG. 1, the right half of the figure shows the state immediately before starting processing, and the left half shows the state after processing is completed. First, the manufacturing equipment will be explained.

A holding cylinder 33 is fastened to the top surface of a base 32 that is fastened to the top surface of the table of a press (not shown in the figure). A restraining plate 34 is fastened on the inside of the bottom end section of the holding cylinder 33, and the bottom end section of a cylindrical shaped lower punch 36, which functions as a receiving punch, is supported and fastened inside a center hole 35 in the restraining plate 34. A thick cylindrical shaped lower die 37, which functions as a floating die, is held inside the upper section of the holding cylinder 33 so that it can move (up and down) in the axial direction of the holding cylinder 33. An elastic member 38 such as a compression coil spring, elastomer such as rubber, or the like is held between the bottom surface of the lower die 37 and the top surface of the retaining plate 34 such that it applies an elastic force in the upward direction on the lower die 37. The upper section of the lower punch 36 is precisely inserted into a center hole 39 in the lower die 37 such that it is capable of movement in the axial direction. Moreover, a lower concave section 41 is formed on the top surface of the lower die 37 in the section surrounding the center hole 39 such that half (inside half when in use) of a mounting flange 15, which is an outward facing flange that is formed around the outer peripheral surface of an intermediate material 40, can fit inside thereof. In order to apply an upwardly directed elastic force on the lower die 37, it is also possible to use pneumatic pressure or hydraulic pressure instead of the aforementioned elastic member 38.

On the other hand, an upper die 43, which functions as a second floating die, is supported by and fastened to the bottom surface of an installation plate 42 that is fastened to the bottom surface of the rain of the press (not shown in the figure) that is located above the base 32. A center hole 44 is formed in the upper die 43 so that a positioning cylinder 16 that is formed on the top end section (the outside end section when in use) of the aforementioned intermediate member 40 can precisely fit on the inside thereof. Moreover, an upper concave section 45 is formed on the bottom surface of the upper die 43 in the section that surrounds the center hole 44 so that the other half (outside half when in use) of the mounting flange 15 can freely fit inside thereof. Furthermore, an upper punch 46, which functions as a pressing punch, is fastened on the inside of the upper die 43. This upper punch 46 comprises a cylindrical shaped outer-diameter side punch 47 and a circular column shaped inner-diameter side punch 48. The shape and dimensions of the tip end sections (bottom end sections) of the outer-diameter side and inner-diameter side punches 47, 48 is regulated in relation to the shape and dimension of the top end section (outside end section when in use) of the intermediate member 40, so that the tip end surface (bottom end surface) of the outer-diameter side punch 47 presses the tip end surface (outside end surface when in use) of the positioning cylinder 16, while at the same time the tip end surface (bottom end surface) of the inner-diameter side punch 48 presses the portion of the end surface (outside end surface when in use) in the axial direction of the intermediate material 40 that is surrounded by the positioning cylinder 16.

Furthermore, the dimensions of the other parts are regulated as follows. First, the dimensions of the parts are regulated so that the tip end surface (bottom end surface) of the upper punch 46 comes in contact with the tip end surface (outside end surface when in use) of the positioning cylinder 16, when the other half of the mounting flange 15 is fitted inside the upper concave section 45. Moreover, the shape and dimension of both concave sections 41, 45 are regulated such that the mounting flange 15 is precisely contained between the lower concave section 41 and the upper concave section 45, when the top surface of the lower die 37 is in contact with the bottom surface of the upper die 43. Also, except for a minute gap that enables the pressing movement, the inner diameter of the center hole 39 in the lower die 37 practically coincides with the outer diameter of a cylindrical surface section 49 that exists in the middle portion in the axial direction of the intermediate material 40 (section that will become the middle section 26 and small-diameter step section 18 after processing). Furthermore, taking into consideration the spring back amount of the material and the lower punch 36 during plastic working, the inner diameter of the lower punch 36 practically coincides with the outer diameter of the small-diameter step section 18 to be processed. In addition, the dimensions in the axial direction of each of the parts are adequately regulated in accordance with the dimensions in the axial direction of the intermediate member 40 (right half in FIG. 1) and the hub body 13a (left half in FIG. 1).

Next, the processes performed by a manufacturing device having the construction described for processing the intermediate material 40 into the hub body 13a will be explained. First, as shown in the right half of FIG. 1, the intermediate material 40 is set between the lower die 37 and the upper die 43. The mounting flange 15 and positioning cylinder 16 are formed beforehand on the upper half (outside half when in use) of the intermediate material 40 by hot forging, and the bottom half (inside half when in use) of the intermediate material 40 is the cylindrical surface section 49 that is to be processed. This kind of intermediate material 40 is inserted inside the lower die 37 from the side of the cylindrical surface section 49 while the upper die 43 and upper punch 46 are raised together with the press ram. When inserted, half of the mounting flange 15 fits inside the lower concave section 41, and the outer diameter portion of the tip end surface of the cylindrical surface section 49 comes in contact with the top end surface of the lower punch 36. In this state, the work of setting the intermediate material 40 (preparation for processing) is completed.

After that, the rain that up until this point was in the raised position is lowered, and first, as shown in the right side of FIG. 1, the outer diameter portion of the top surface of the lower die 37 is brought into contact with the outer diameter portion of the upper die 43. Next, the ram is further lowered, which causes the upper punch 46 to forcibly press the intermediate material 40 in the direction toward the lower punch 36. As a result, the tip end section (bottom end section) of the cylindrical surface section 49 located on the lower half of the intermediate material 40 plastically deforms while being pressed into the lower punch 36, and as shown by the left half of FIG. 1, the small-diameter step section 18 is formed. After that, the rain is raised again, and the hub body 13a leaving this formed small-diameter step section 18 is removed. After necessary finishing such as quench hardening is performed on the surface of this small-diameter step section 18, the hub body 3a is assembled together with other members to form a rolling bearing unit for wheel support for undriven wheels as shown in FIG. 19 described above. It is preferred that the manufacturing apparatus described above have a counter punch for pushing the hub body out from the lower die 37 after processing. A counter punch is well known in the field of press processing so it is not shown in the figures, and a detailed explanation of it is omitted.

By manufacturing the hub body 13a as described above, it is possible to use cold forging to stably process the small-diameter step section 18 with high precision on the inside end section of the intermediate material 40 on which the mounting flange 15 and positioning cylinder 16 have already been formed beforehand by hot forging.

Figure 20:
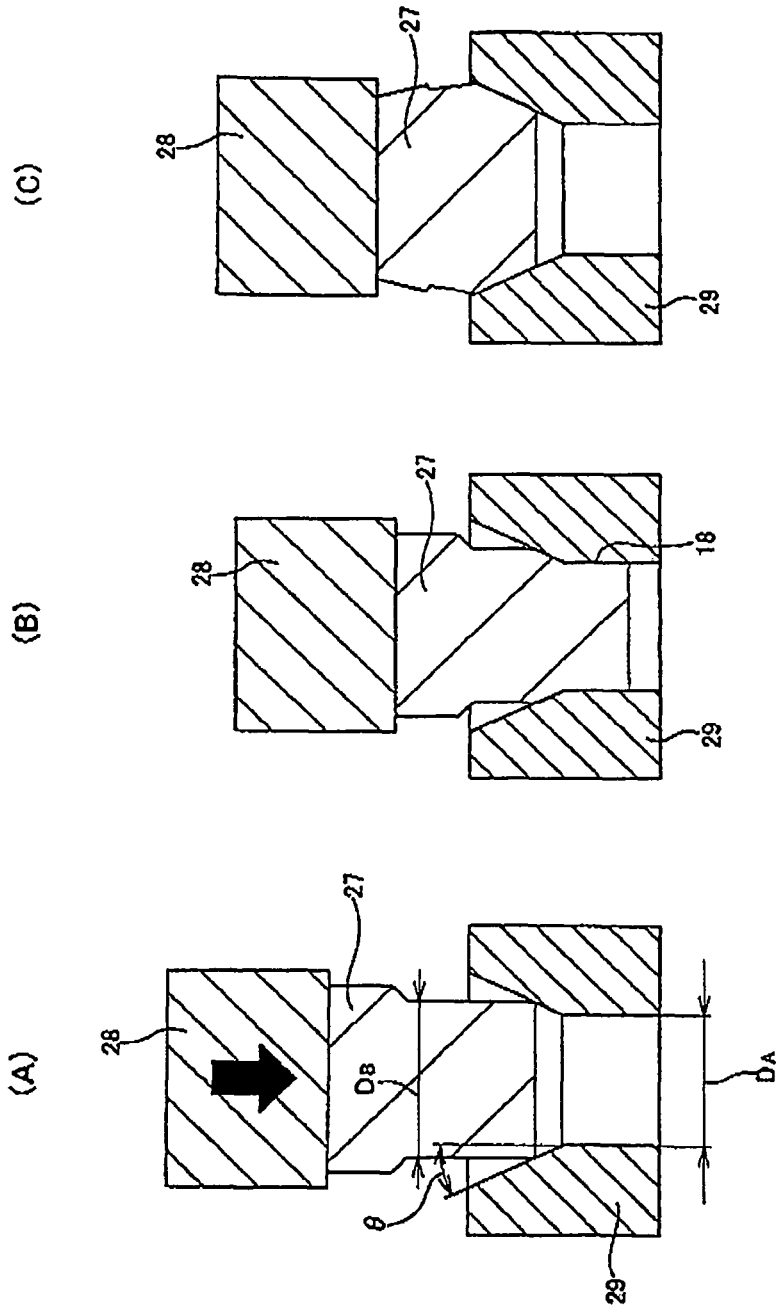
FIG. 20(A) to (C) are cross-section drawings showing the states of forming a hub by ironing.

In other words, the small-diameter step section 18 is processed using cold forging by plastically deforming the intermediate material 40 at room temperature without heating, so it is possible to keep dimension errors due to differences in thermal expansion of the intermediate material 40 and lower punch 36 to a minimum, and thus improve the dimensional precision. In addition, since processing is performed with the outer peripheral surface of the intermediate material 40 being processed (the hub body 13a after processing) including the mounting flange 15, positioning cylinder 16 and cylindrical surface section 49 held by the lower die 37 and upper die 43, which are floating dies, the intermediate material 40 (the hub body 13a after processing) does not deform outward in the radial direction as in the case shown in (C) of FIG. 20 described above. Therefore, even though there may be a large difference in outer diameter between the cylindrical surface section 49 and the small-diameter step section 18, or even though the incline of the continuous step surface between the small-diameter step section 18 and the remaining portion of the cylindrical surface section 49 (middle section 26) may be steep, it is possible to process this small-diameter step section 18 stably.

When the processing of the small-diameter step section 18 is performed after forming one of or both the mounting flange 15 and positioning cylinder 16 beforehand (whether by hot forging or cold forging) as in this embodiment, it is possible to easily perform the processing of this small-diameter step section 18, so annealing (process annealing) of this intermediate material 40 is feasible. When this kind of process annealing is performed, it is also possible that the strength of one or both the mounting flange 15 and positioning cylinder 16 that are formed beforehand will be insufficient. Therefore, when this process annealing is performed, one or both the mounting flange 15 and positioning cylinder 16 are formed to a size a little larger than the size after completion, then after process annealing (whether performed before or after processing of the small-diameter step section 18) by performing cold plastic working to the size after completion, it is possible to increase the strength of one or both the mounting flange 15 and positioning cylinder 16 to the necessary value by work hardening.

As a method for maintaining the strength of one or both the mounting flange 15 and positioning cylinder 16 by this kind of work hardening is a flange finishing process that is performed on the mounting flange 15, for example, to bring the thickness dimension of the mounting flange 15 to the proper value (decrease from the dimension larger than the proper value). More specifically, in this flange finishing process, a upsetting process is performed on the mounting flange 15 to compress and plastically deform the portion of the mounting flange 15 that includes the base section (inner end section in the radial direction) in the axial direction. Also, at the same time that the thickness dimension of the mounting flange 15 is brought to the proper value, the strength of at least the base section of the mounting flange 15 is increased to the necessary value.

Moreover, there is a cylinder finishing process that is performed on the positioning cylinder 16, for example, to bring the inner and outer diameters of the positioning cylinder 16 to the proper value (increase the inner diameter from a dimension a little smaller than the proper value, and reduce the outer diameter from a dimension a little larger than the proper value). More specifically, in this cylinder finishing process, a cold ironing process is performed on the positioning cylinder 16 in the cylindrical section having an outer diameter that is slightly larger than the proper value and inner diameter that is slightly less than the proper value. As the inner and outer diameters of the cylindrical section are brought to the proper values, the strength is improved to obtain the positioning cylinder 16 described above.

Second Embodiment

Figure 2:
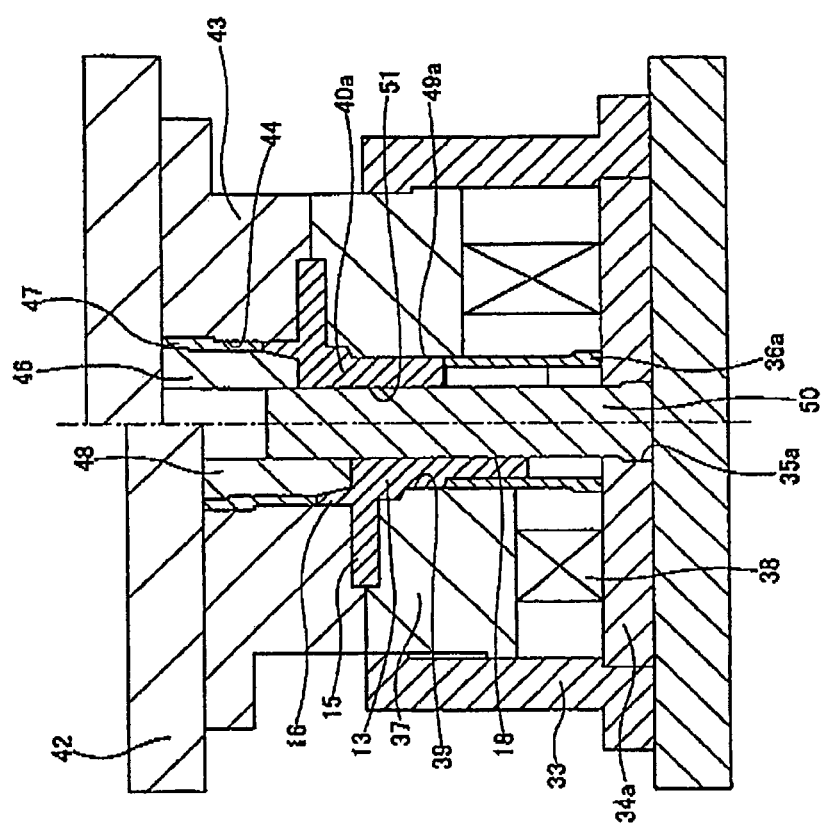
FIG. 2 is a cross-section drawing showing a second embodiment of the present invention.
Figure 18:
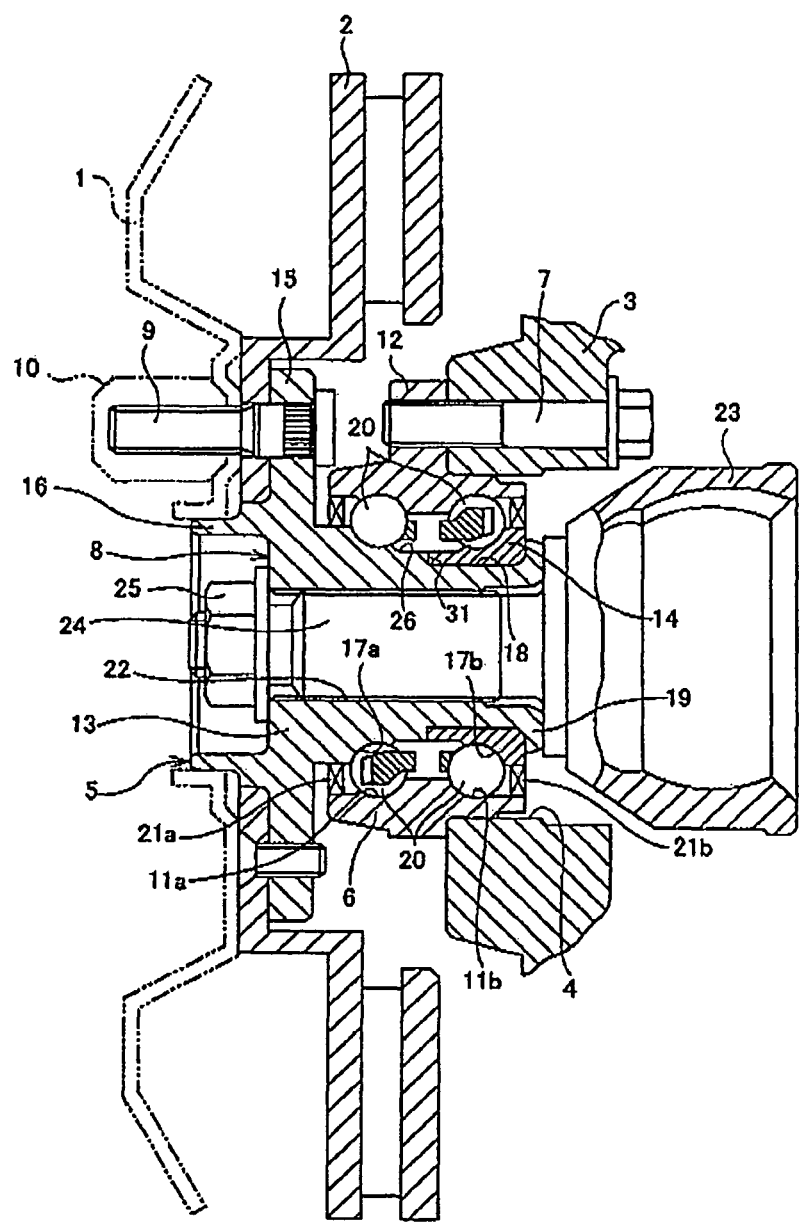
FIG. 18 is a cross-section drawing showing the state when an example of a hub unit for wheel support of drive wheels is attached to a knuckle.

FIG. 2 shows a second embodiment of the present invention. The purpose of this embodiment is the manufacture of a hub body (bearing ring member) 13 of a rolling bearing unit for wheel support for drive wheels as shown in FIG. 18 and described above. In this embodiment, the base end section (bottom end section) of a circular column shaped mandrel 50 is supported and fastened in the center hole 35a of a retaining plate 34a of the manufacturing apparatus, and the base end section (bottom end section) of a cylindrical shaped lower punch 36 is fastened on the top surface of this retaining plate 34a around the mandrel 50 so that it is concentric with the mandrel 50. Moreover, an intermediate material 40, around whose outer peripheral surface a small-diameter step section 18 is to be formed, is cylindrical shaped having a center hole 51. It is preferred that this center hole 51 be a simple circular hole (a female spline is processed later) in that it will be easier to remove the hub body 13 from it after processing. However, in the case that the female spline is already formed, it is preferred that a male spline that will fit with the female spline be formed on the outer peripheral surface of the mandrel 50 in that doing so will prevent the female spline from deforming due to processing.

Except for inserting a mandrel 50 into the center hole 51 in the intermediate material 40, the work of using the manufacturing apparatus described above to process the intermediate material 40 into the hub body 13 is performed the same way as in the first embodiment described above. In the case of this embodiment, this mandrel 50 prevents the cylindrical surface section 49a of the intermediate material 40 from deforming inward in the radial direction while processing the intermediate material 40 into the hub body 13. The other construction and function are the same as in the first embodiment described above so any redundant explanation is omitted.

[Processes for Processing the Bearing Ring Member]

As described above, when embodying the present invention, it does not matter whether the work of processing the small-diameter step section 18 comes before or after the work of forming the mounting flange 15 and positioning cylinder 16. Also, the methods for processing the mounting flange 15 and positioning cylinder 16 are not particularly specified. Therefore, a few detailed examples of the whole processes for processing the hub body 13a for undriven wheels, which is the bearing ring member, and methods for processing the mounting flange 15 and positioning cylinder 16 will be explained below. In the case of processing a hub body 13 for drive wheels, except for using a mandrel 50 as explained above when processing the small-diameter step section 18, processing can be performed nearly the same as for undriven wheels.

[First Example of Processes]

Figure 3:
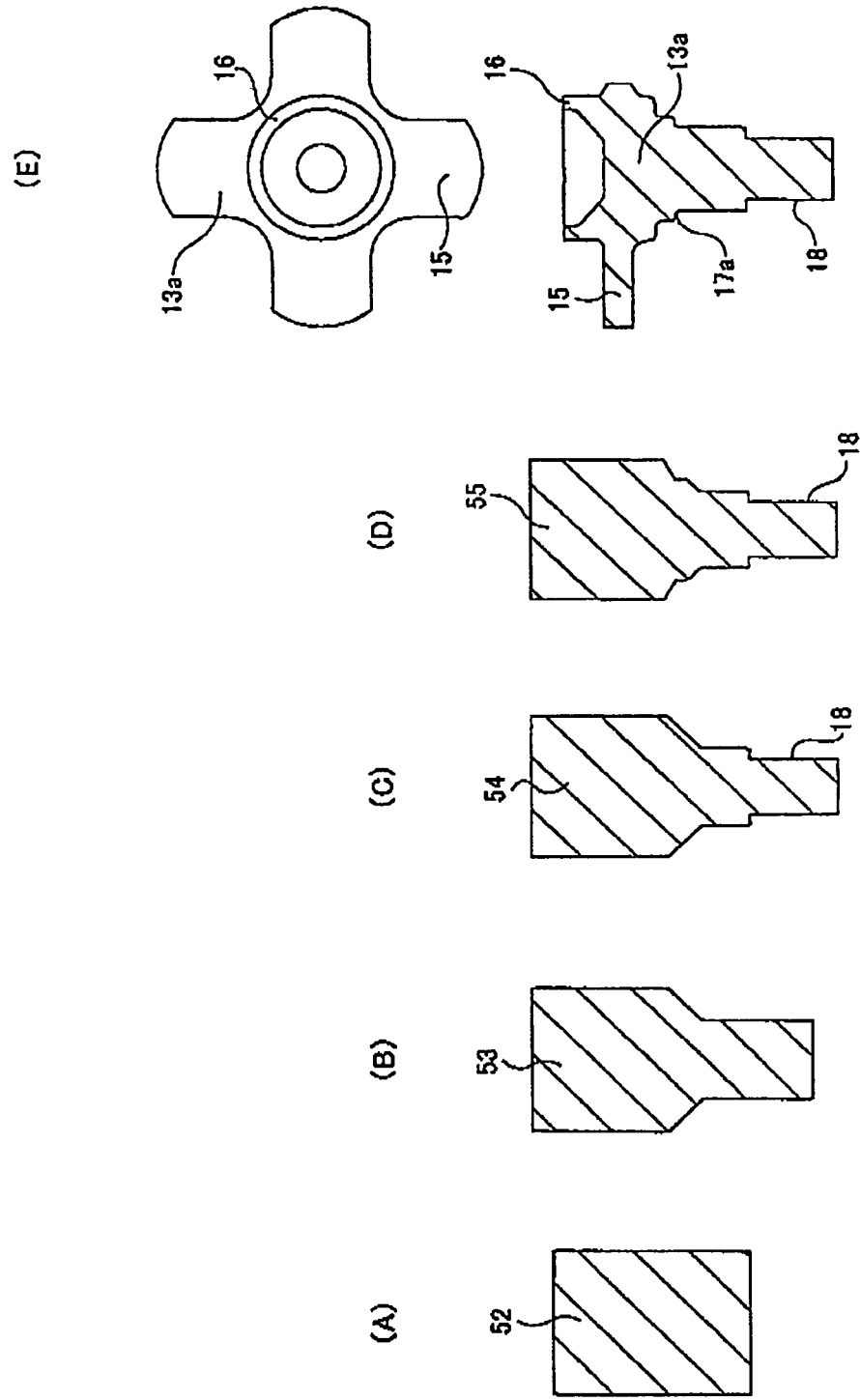
FIG. 3(A) to (E) are cross-section drawings and an end view showing in order a first example of the processes for processing a bearing ring member.

A forward extrusion process is performed on the circular column shaped material 52 shown in (A) of FIG. 3 to obtain a stepped first intermediate material 53 as shown in (B) of FIG. 3. This first intermediate material 53 is a metallic material, and the manufacturing method of the present invention, or in other words, cold forging (extrusion) using floating dies is performed to obtain a second intermediate material 54 as shown in (C) of FIG. 3. Next, processing is performed on this second intermediate material 54 to form a step section for locating an angular inner raceway 17a (see FIG. 19) on the outside in the axial direction, and to form a third intermediate material 55 as shown in (D) of FIG. 3. Furthermore, a side extrusion process and a process for forming the inner raceway 17a are performed on this third intermediate member 55 to obtain the hub body 13a as shown in (E) of FIG. 3.

Figure 4:
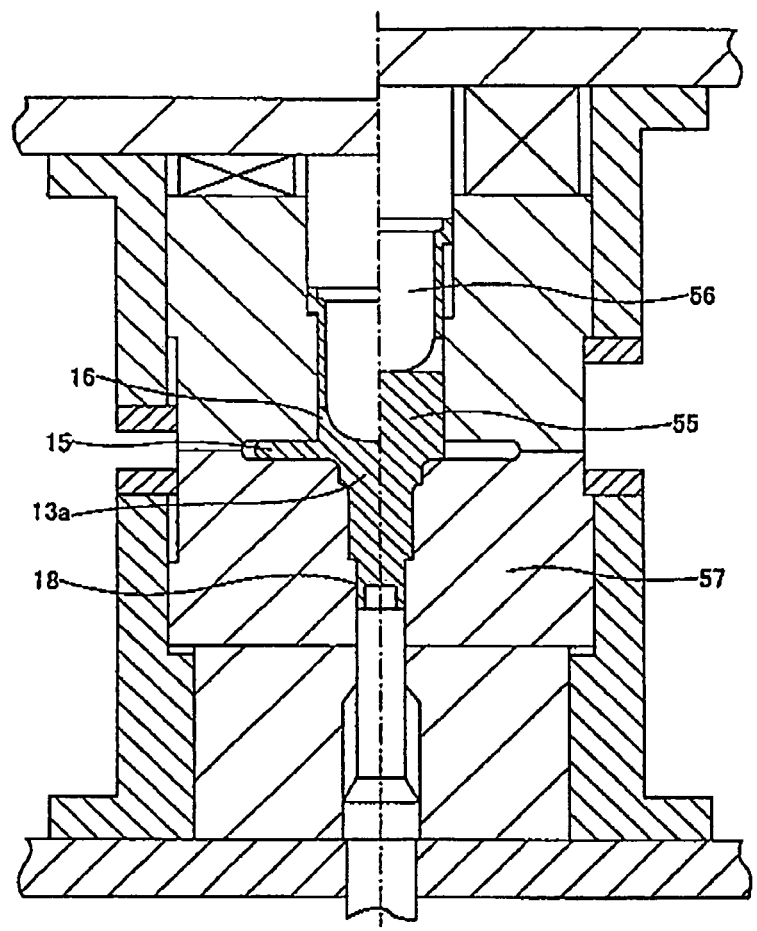
FIG. 4 is a cross-section drawing showing an example of the state of the extrusion process on one side.

The side extrusion process mentioned above is performed according to a method disclosed in Japanese Patent Application No. 2004-298585, for example. In other words, as shown in FIG. 4, the third intermediate material 55 is pressed from the sides by a pressing mold 56 and receiving mold 57 causing the metallic material to escape (flow) outwardly in the radial direction, forming the mounting flange 15 and positioning cylinder 16. The right half of FIG. 4 shows the state immediately before processing, and similarly, the left half shows the state immediately after processing is complete. Details about the side extrusion process are disclosed in Japanese Patent Application No. 2004-298585, and since it is not related to the subject matter of the present invention, a detailed explanation is omitted here.

[Second Example of Processes]

Figure 5:
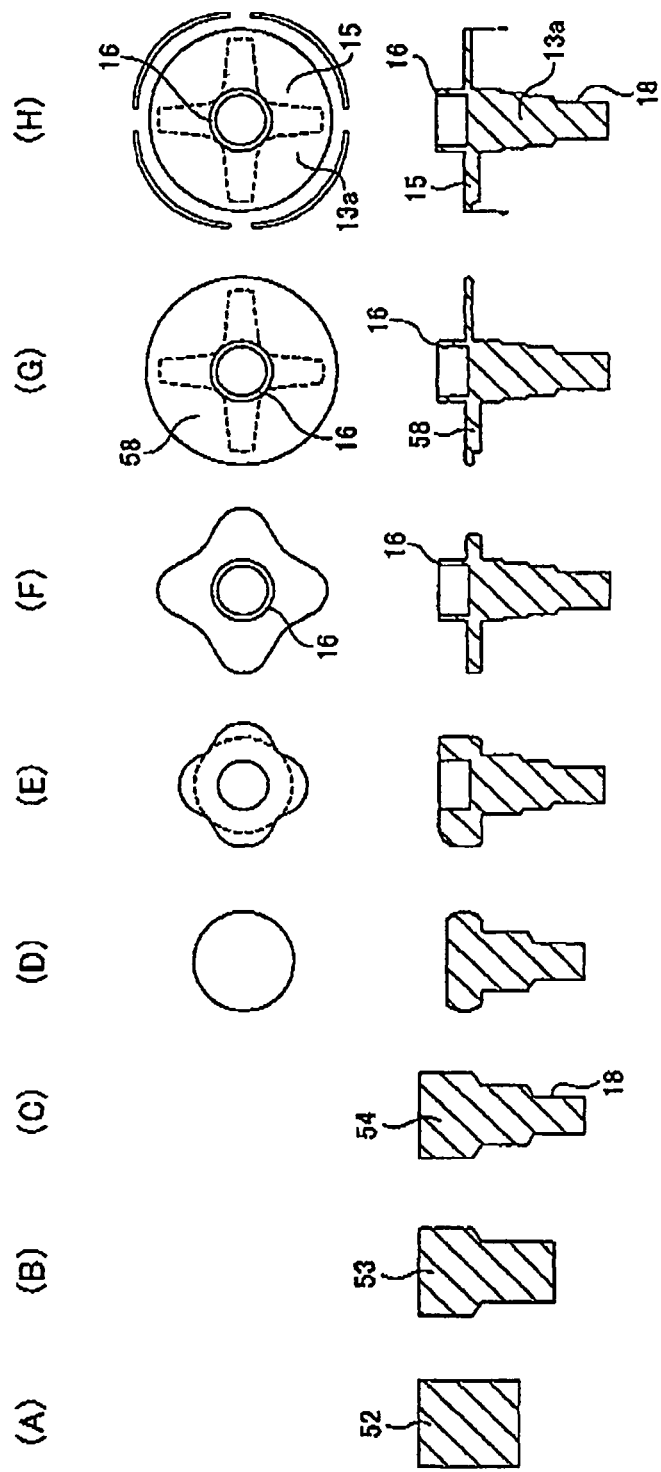
FIG. 5(A) to (H) are cross-section drawings and end views showing in order a second example of the processes for processing a bearing ring member.

A forward extrusion process is performed on the circular column shaped intermediate material 52 shown in (A) of FIG. 5 to obtain a stepped first intermediate material 53 as shown in (B) of FIG. 5. This first intermediate material 53 is a metallic material, and the manufacturing method of the present invention, or in other words, cold forging (extrusion) using floating dies is performed to obtain a second intermediate material 54 as shown in (C) of FIG. 5. Next a upsetting process having a plurality of steps is performed on this second intermediate material 54 as shown in (D)→(E)→(F)→(G), and after intermediate material is formed in each step, the remaining material on the outer edge around the rough mounting flange 58 is removed by trimming to obtain the hub body 13a as shown in (H) of FIG. 5.

Figure 6:
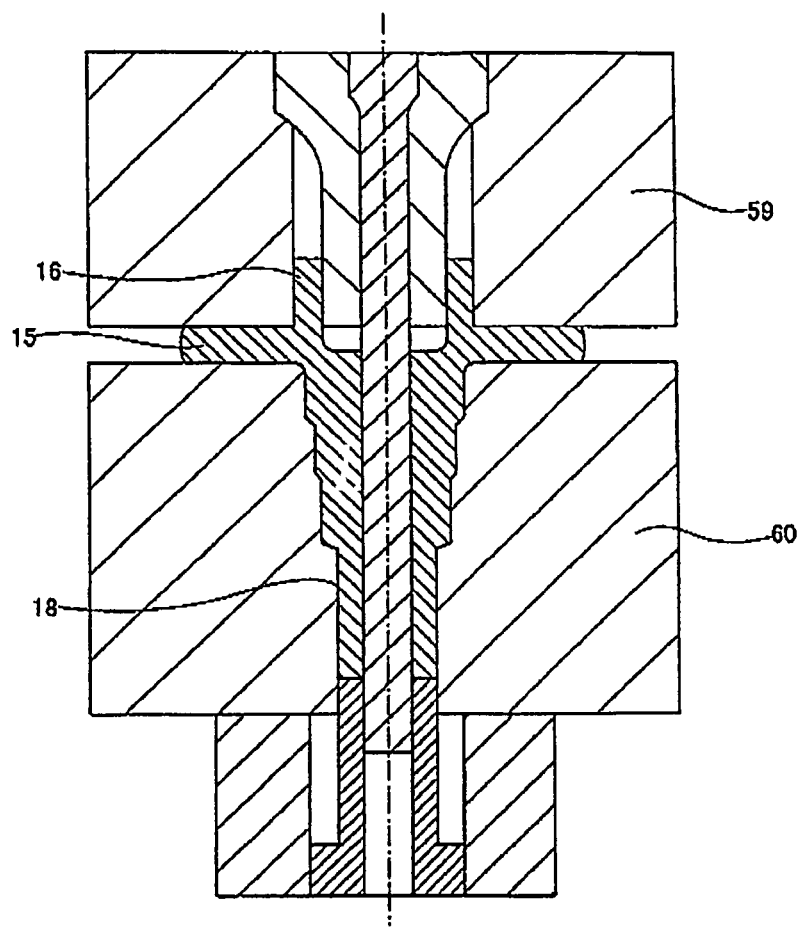
FIG. 6 is a cross-section drawing showing an example of the state of the upsetting process.

Each of the steps of the upsetting process is performed according to the method disclosed in Japanese Patent Application No. 2004-335534, for example. In other words, as shown in FIG. 6 corresponding to the process (F)→(G) shown in FIG. 5, the intermediate material of each step is pressed in the axial direction by a pressing mold 59 and receiving mold 60, causing the metallic material to escape (flow) outward in the radial direction, forming the mounting flange 15 and positioning cylinder 16. Details about each of the steps of the upsetting process are disclosed in Japanese Patent Application No. 2004-335534, and since they are not related to the subject matter of the present invention, a detailed explanation is omitted here.

[Third Example of Processes]

Figure 7:
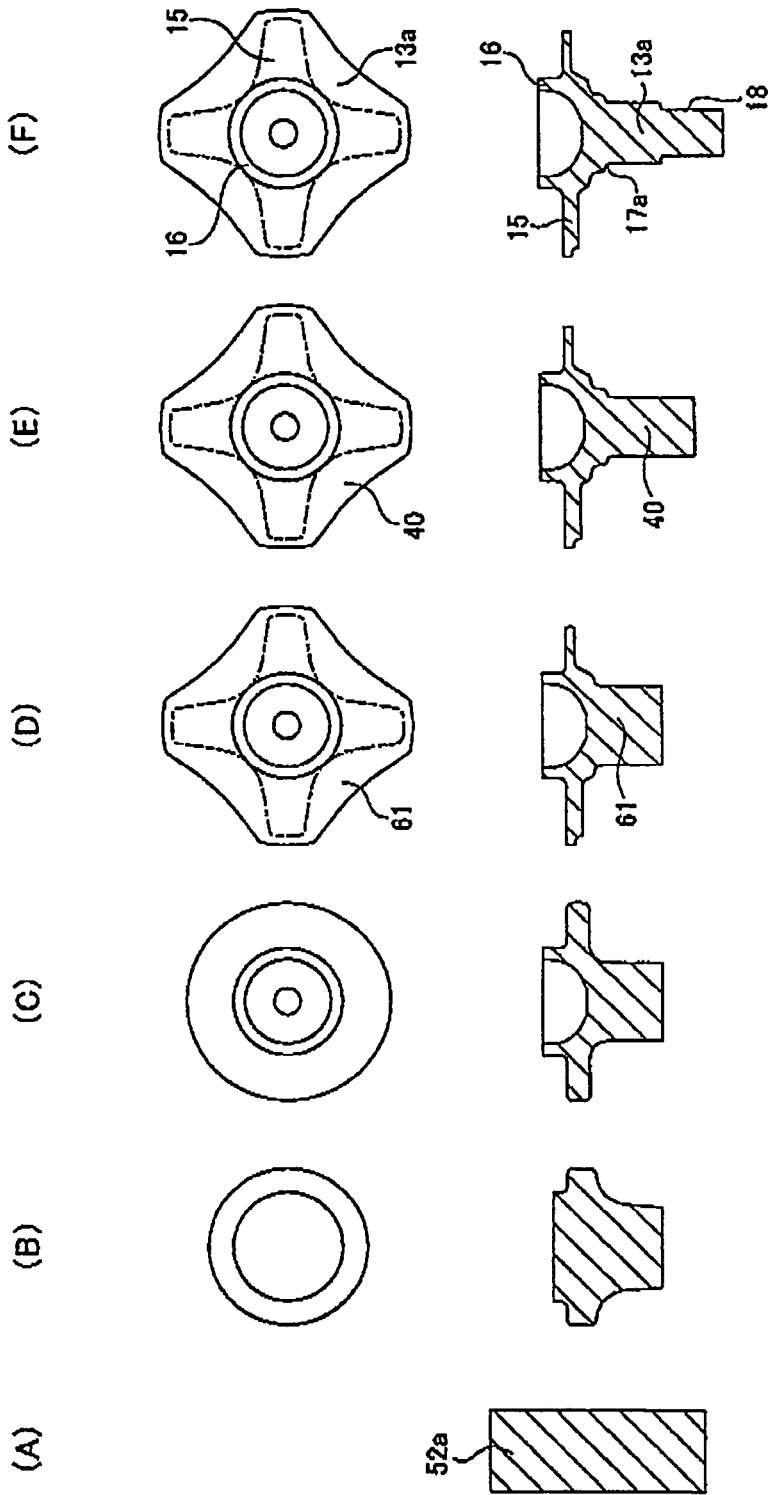
FIG. 7(A) to (F) are cross-section drawings and end views showing in order a third example of the processes for processing a bearing ring member.

A top section upsetting process ((B) of FIG. 7), top section backward extrusion process ((C) of FIG. 7) and a upsetting process, which are all types of hot forging processes, are performed in order on the circular column shaped material 52a shown in (A) of FIG. 7 to obtain the preparatory intermediate material 61 as shown in (D) of FIG. 7. This preparatory intermediate material 61 is a metallic material, and the manufacturing method of the present invention, or in other words, cold forging (extrusion) using floating dies is performed to obtain an intermediate material 40 as shown in (E) of FIG. 7. This intermediate material 40 is also a metallic material, and corresponds to the intermediate material 40 of the first embodiment described above. As in the first embodiment shown in FIG. 1 and described above, cold forging (extrusion) using floating dies is performed on first intermediate material 40 to form the hub body 13a as shown in (F) of FIG. 7. That is, the manufacturing method of the present invention is performed two times, before and after.

[Fourth Example of Processes]

Figure 8:
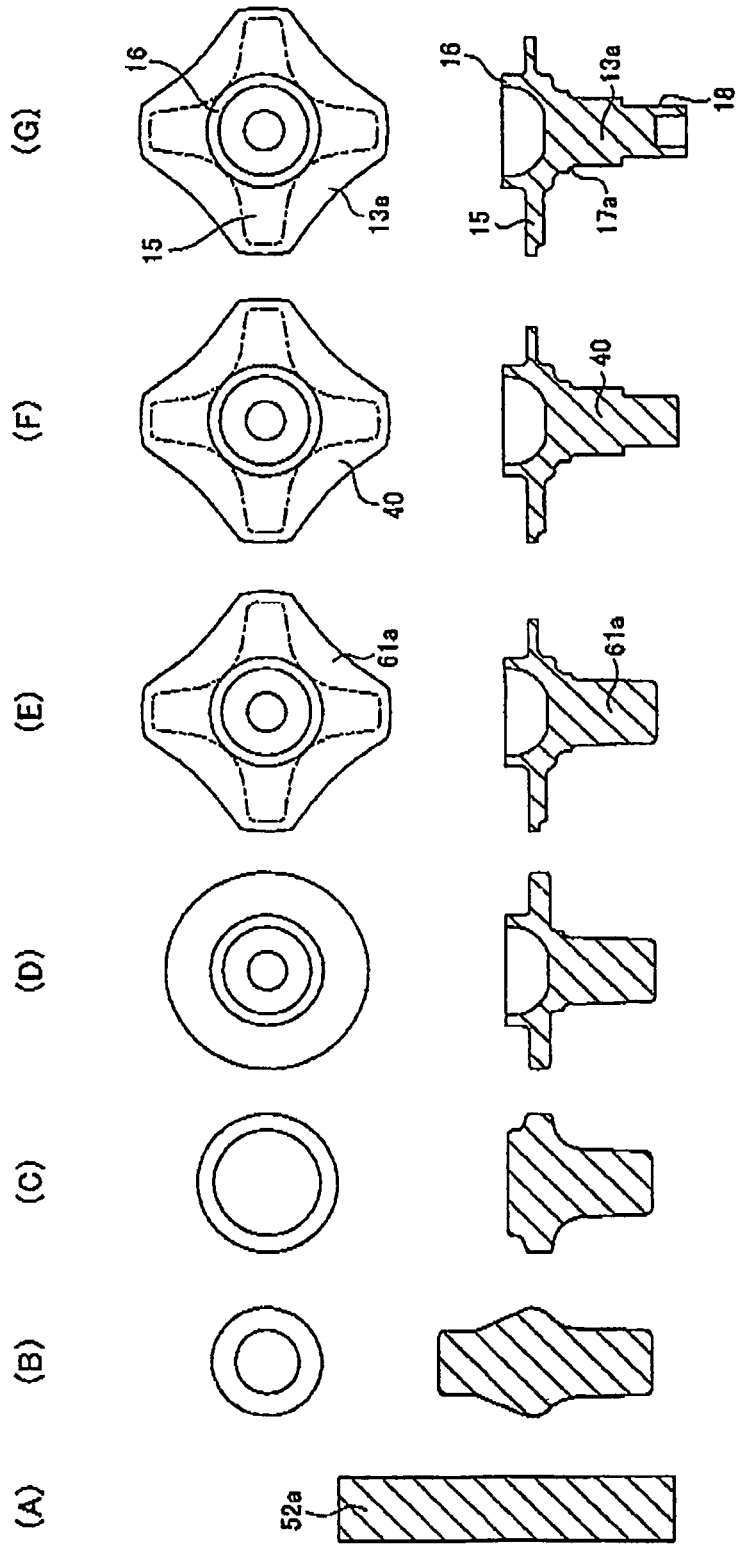
FIG. 8(A) to (G) are cross-section drawings and end views showing in order a fourth example of the processes for processing a bearing ring member.

A plurality of steps of a upsetting process, which are all forms of hot forging, are performed successively on the circular column shaped material 52a shown in (A) of FIG. 8, to obtain a preparatory intermediate material 61a as shown in (E) of FIG. 8. Thus preparatory intermediate material 61a is also a metallic material, and the manufacturing method of the present invention is performed on it to obtain the intermediate material 40 shown in (F) of FIG. 8. This intermediate material 40 is also a metallic material and corresponds to the intermediate material 40 in the first embodiment of the invention described above. As in the first embodiment described above, cold forging (extrusion) using floating dies is performed on this intermediate material 40 to form a hub body 13a as shown in (G) of FIG. 8. That is, in this example as well, the manufacturing process of the present invention is performed two times, before and after.

[Fifth Example of Processes]

Figure 9:
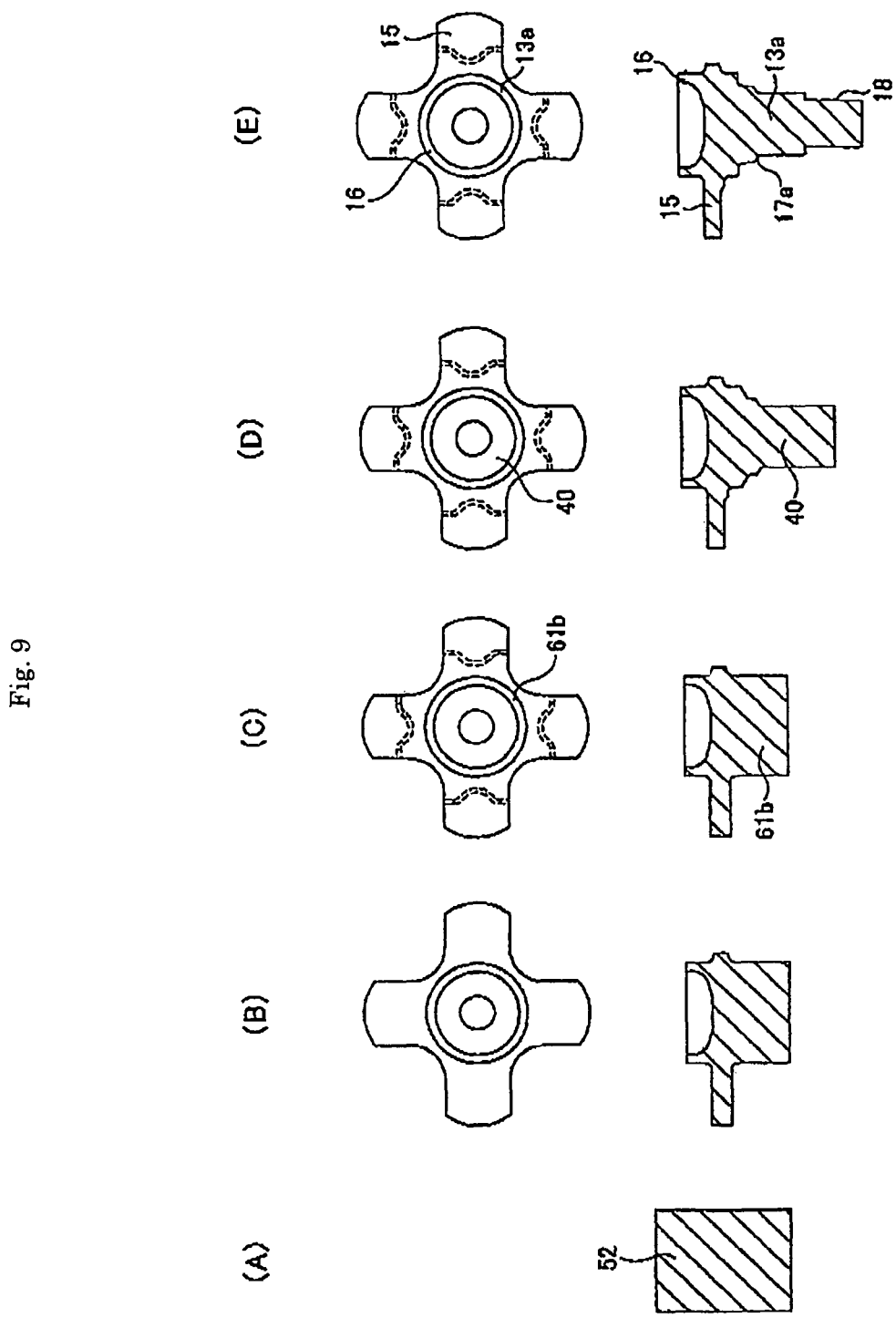
FIG. 9(A) to (E) are cross-section drawings and end views showing in order a fifth example of the processes for processing a bearing ring member.

Side extrusion ((B) of FIG. 9), and upsetting ((C) of FIG. 9), which are both forms of cold forging, are successively performed on the circular column shaped material 52 shown in (A) of FIG. 9 to obtain a preparatory intermediate material 61b as shown in (C) of FIG. 9. This preparatory intermediate material 61b is a metallic material, and the manufacturing method of the present invention is performed on it to obtain an intermediate material 40 as shown in (C) of FIG. 9. This intermediate material 40 is also a metallic material and corresponds to the intermediate material 40 of the first embodiment described above. As in the first embodiment described above, cold forging (extrusion) using floating dies is performed on this intermediate material 40 to form a hub body 13a as shown in (E) of FIG. 9. That is, in this example as well, the manufacturing process of the present invention is performed two times, before and after.

[Sixth Example of Processes]

Figure 10:
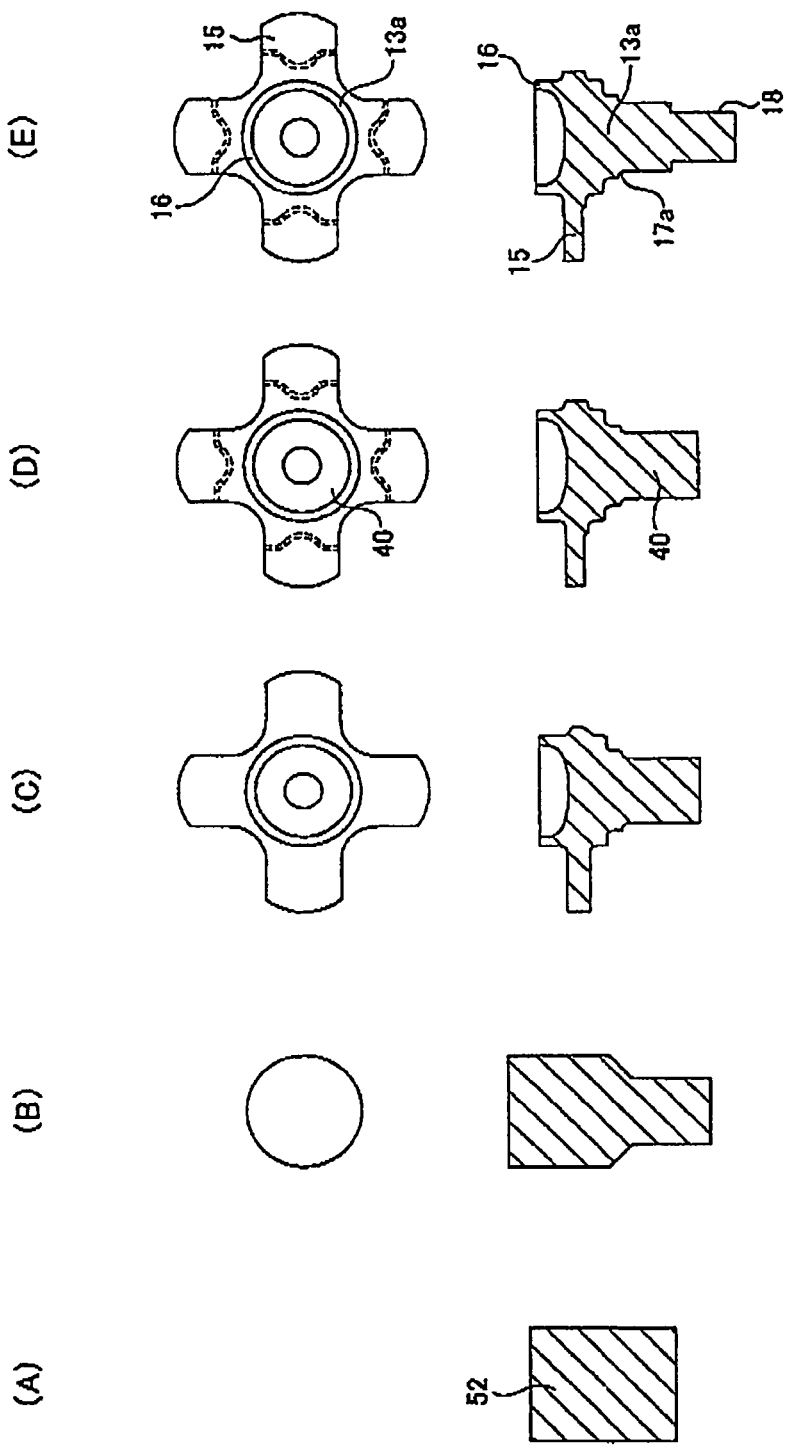
FIG. 10(A) to (E) are cross-section drawings and end views showing in order a sixth example of the processes for processing a bearing ring member.

Forward extrusion ((B) of FIG. 10), side extrusion ((C) of FIG. 10) and upsetting ((E) of FIG. 10), which are all forms of cold forging, are performed on a circular column shaped material 52 shown in (A) of FIG. 10 to obtain an intermediate material 40 as shown in (D) of FIG. 10. This intermediate material 40 is a metallic material on which the manufacturing method of the present invention is performed to obtain a hub body 13a as shown in (E) of FIG. 10.

[Seventh Example of Processes]

Figure 11:
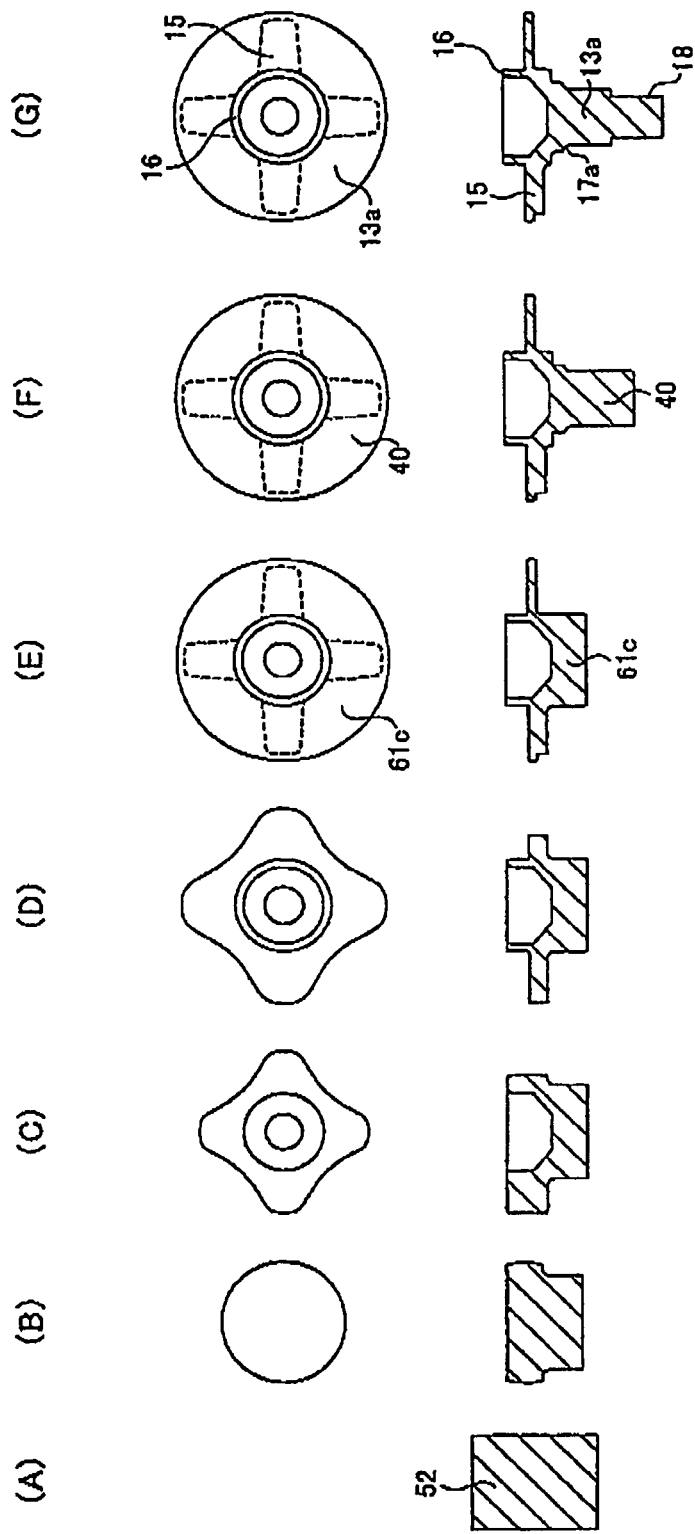
FIG. 11(A) to (C) are cross-section drawings and end views showing in order a seventh example of the processes for processing a bearing ring member.

A plurality of steps of a upsetting process, which are all forms of cold forging, are performed as shown in (B)→(C)→(D)→(E) of FIG. 11 on a circular column shaped material 52 shown in (A) of FIG. 11 to obtain a preparatory intermediate material 61c as shown in (E) of FIG. 11. This preparatory intermediate material 61c is a metallic material on which the manufacturing method of the present invention is performed to obtain an intermediate material 40 as shown in (F) of FIG. 11. This intermediate material 40 is also a metallic material and corresponds with the intermediate material 40 of the first embodiment described above. Therefore, as in the first embodiment shown in FIG. 1 and described above, cold forging (extrusion) using floating dies is performed on this intermediate material 40 to form a hub body 13a as shown in (G) of FIG. 11. That is, in this example as well, the manufacturing process of the present invention is performed two times, before and after.

[Eighth Example of Processes]

Figure 12:
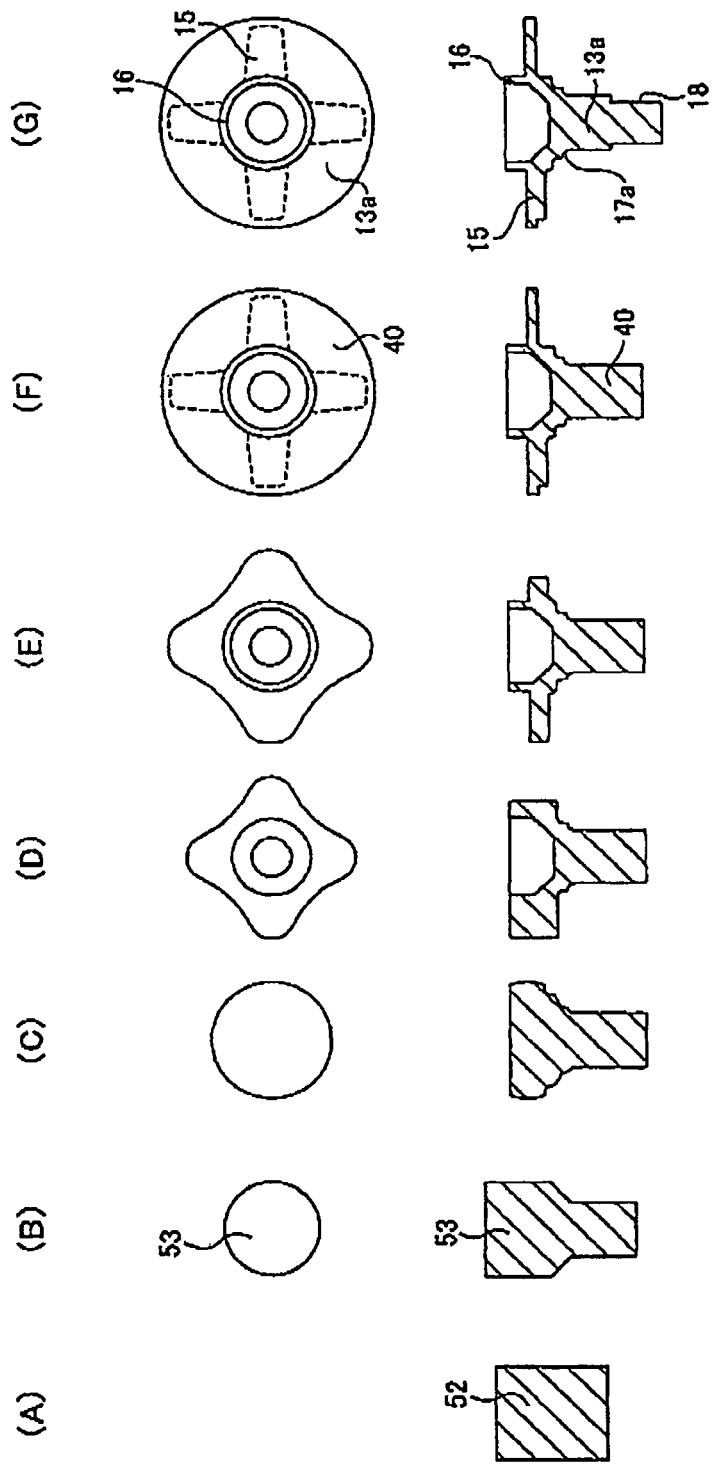
FIG. 12(A) to (G) are cross-section drawings and end views showing in order a twelfth example of the processes for processing a bearing ring member.

Forward extrusion, which is a form of cold forging, is performed on a circular column shaped material 52 shown in (A) of FIG. 12, and after obtaining a first stepped intermediate material 53 as shown in (B) of FIG. 12, a plurality of steps of a upsetting process, which are all forms of cold forging, are performed as shown in (C)→(D)→(E)→(F) of FIG. 12 on the first intermediate material 53 to obtain an intermediate material 40 as shown in (F) of FIG. 12. This intermediate material 40 is also a metallic material and corresponds with the intermediate material 40 of the first embodiment described above. As in the first embodiment shown in FIG. 1 and described above, cold forging (extrusion) using floating dies is performed on this intermediate material 40 to form a hub body 13a as shown in (G) of FIG. 12.

[Finishing Process of a Bearing Ring Member]

As mentioned above, in the case of performing annealing (process annealing) of the intermediate material, one or boil the mounting flange 15 and positioning cylinder 16 are formed a little larger than the size after completion, and after annealing, the size is reduced to the size after completion by cold plastic working, and by work hardening it is possible for the strength of one or both the mounting flange 15 and positioning cylinder 16 to be increased to the necessary value. A few detailed examples of the finishing processing that is performed for that purpose are explained below.

[First Example of the Finishing Process]

Figure 13:
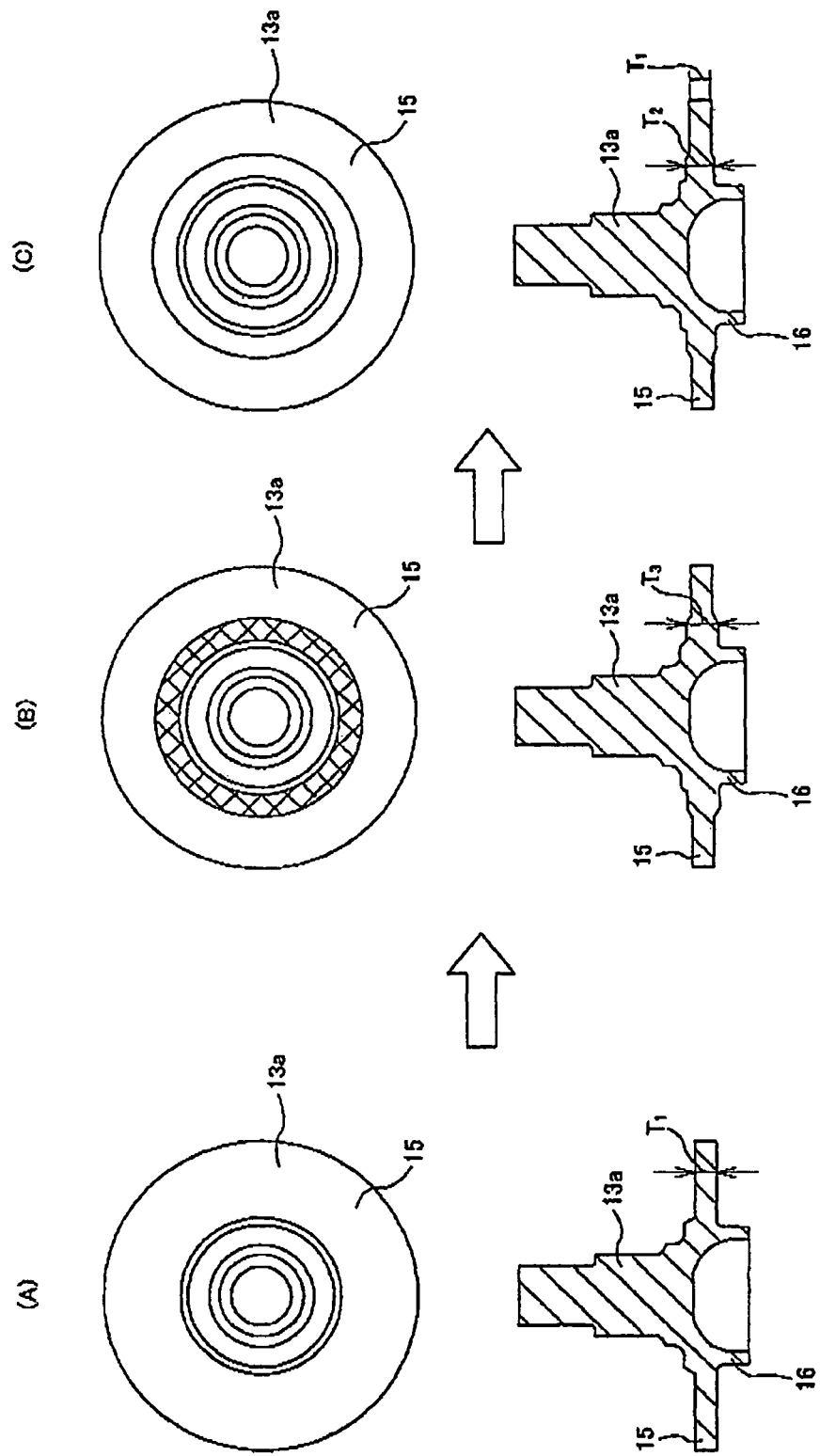
FIG. 13(A) to (C) are cross-section drawings and end views for explaining a first example of the finishing processes of a bearing ring member.

In order to obtain a circular mounting flange 15 having a thickness $T_1$ as shown in (A) of FIG. 13, the thickness $T_3$ of the base end section (end section on the inner diameter side) of this mounting flange 15 as shown in (B) of FIG. 13 is made to be greater than the thickness $T_2$ of the base end section after completion shown in (C) of FIG. 13 ($T_1 \leq T_2 < T_3$). After process annealing, the base end section (the hatch section in the upper portion of (B) of FIG. 13) of the mounting flange 15 is pressed by upsetting to reduce the thickness dimension of this base end section to $T_2$, and increase the strength of this base end section while at the same time maintaining the precision of the dimension of the base end section of the mounting flange 15.

[Second Example of the Finishing Process]

Figure 14:
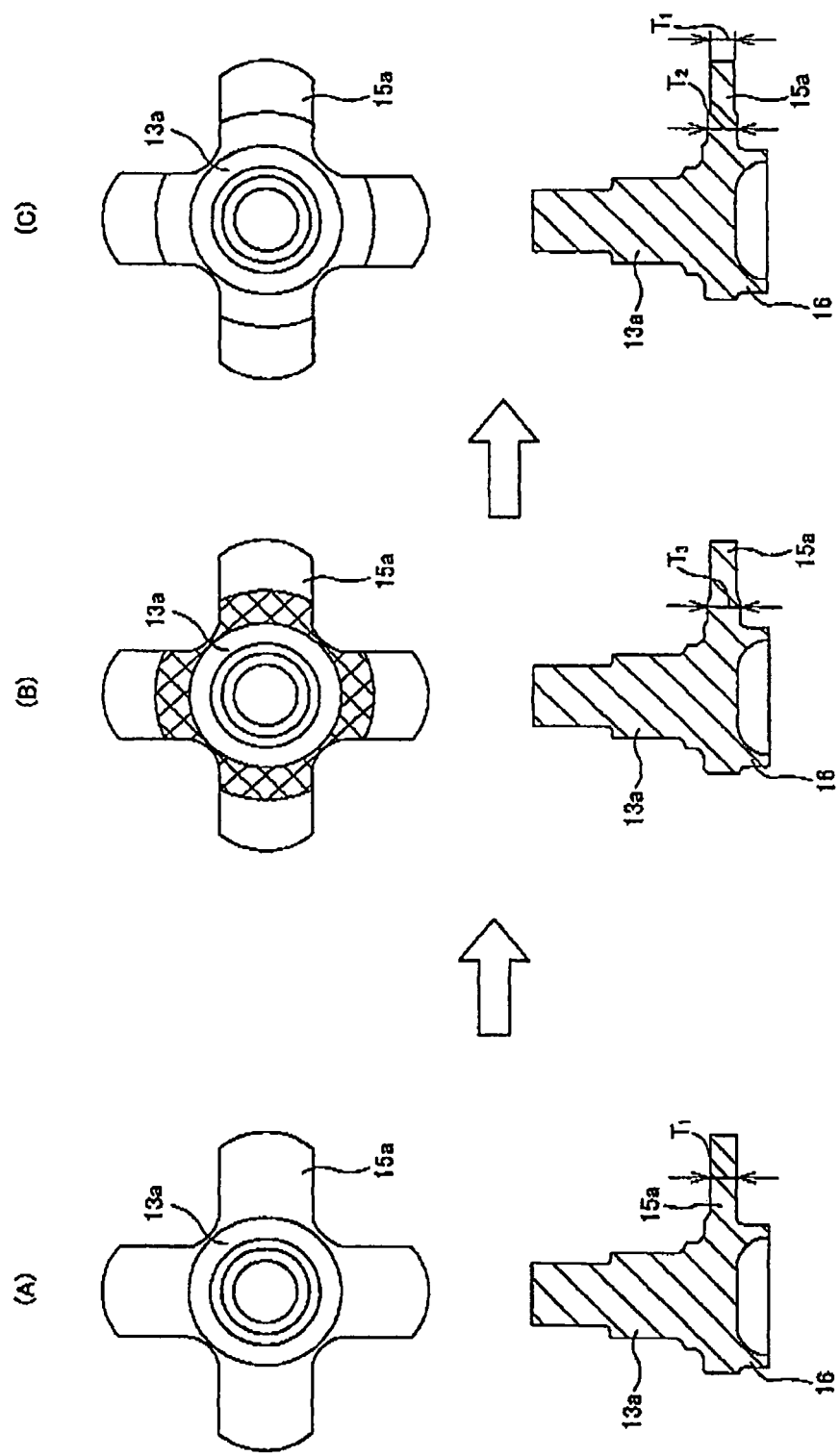
FIG. 14(A) to (C) are cross-section drawings and end views for explaining a second example of the finishing processes of a bearing ring member.

In order to obtain a radial shaped mounting flange 15a having a thickness $T_1$ as shown in (A) of FIG. 14, the thickness $T_3$ of the base end section (end section on the inner diameter side) of this mounting flange 15a as shown in (B) of FIG. 14 is made to be greater than the thickness $T_2$ of the base end section after completion shown in (C) of FIG. 14 ($T_1 \leq T_2 < T_3$). After process annealing, the base end section (the hatch section in the upper portion of (B) of FIG. 14) of the mounting flange 15a is pressed by upsetting to reduce the thickness dimension of this base end section to $T_2$, and increase the strength of this base end section while at the same time maintaining the precision of the dimension of the base end section of the mounting flange 15a.

[Third Example of the Finishing Process]

Figure 15:
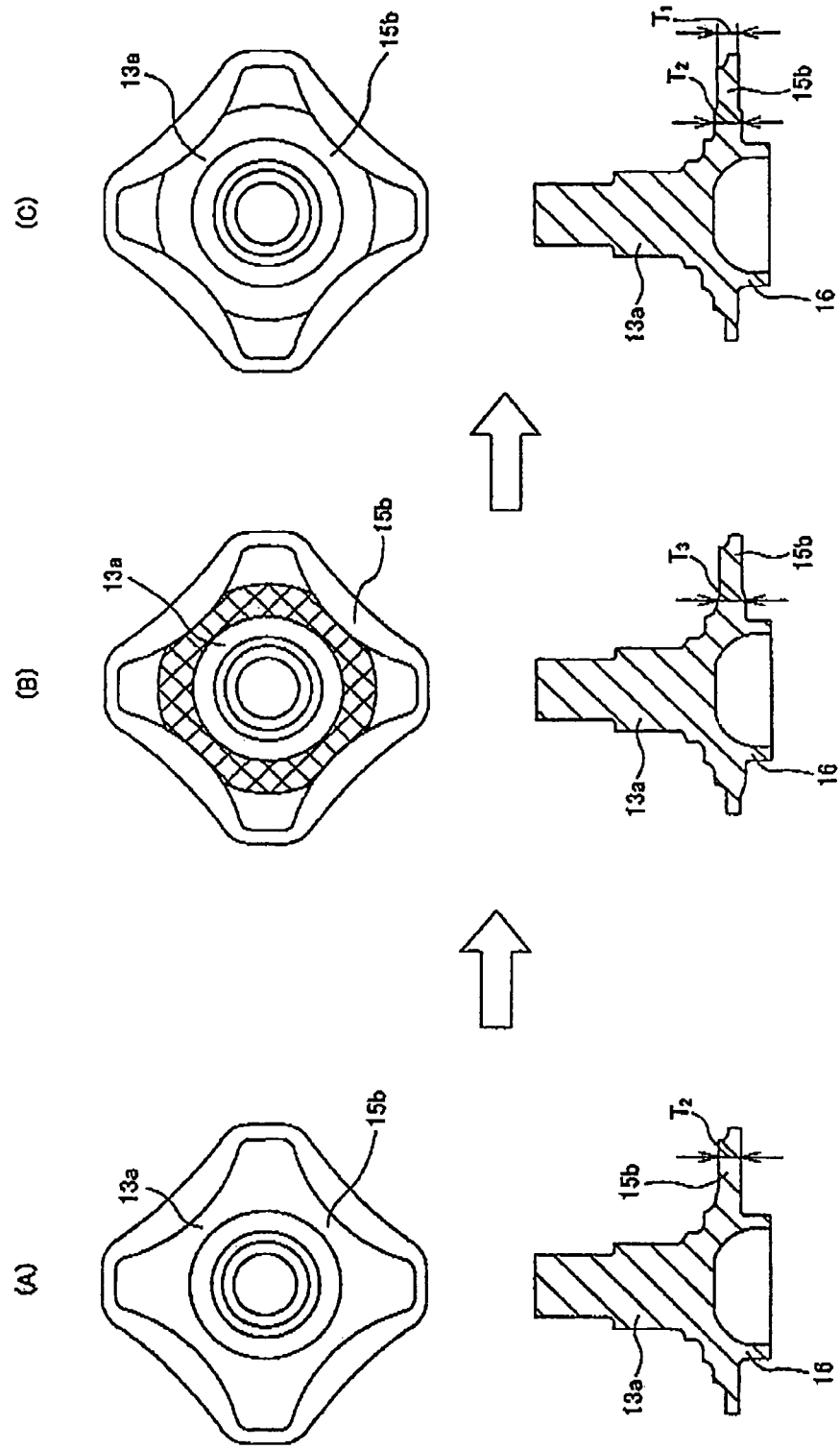
FIG. 15(A) to (C) are cross-section drawings and end views for explaining a third example of the finishing processes of a bearing ring member.

In order to obtain a mounting flange 15b having a portion on its outer peripheral edge of which the thickness becomes small, and whose thickness at a representative portion is $T_1$ as shown in (A) of FIG. 15, the thickness $T_3$ of the base end section (end section on the inner diameter side) of this mounting flange 15b as shown in (B) of FIG. 15 is made to be greater than the thickness $T_2$ of the base end section after completion shown in (C) of FIG. 15 ($T_1 \leq T_2 < T_3$). After process annealing, the base end section (the batch section in the upper portion of (B) of FIG. 15) of the mounting flange 15b is pressed by upsetting to reduce the thickness dimension of this base end section to $T_2$, and increase the strength of this base end section while at the same time maintaining the precision of the dimension of the base end section of the mounting flange 15b.

[Fourth Example of the Finishing Process]

Figure 16:
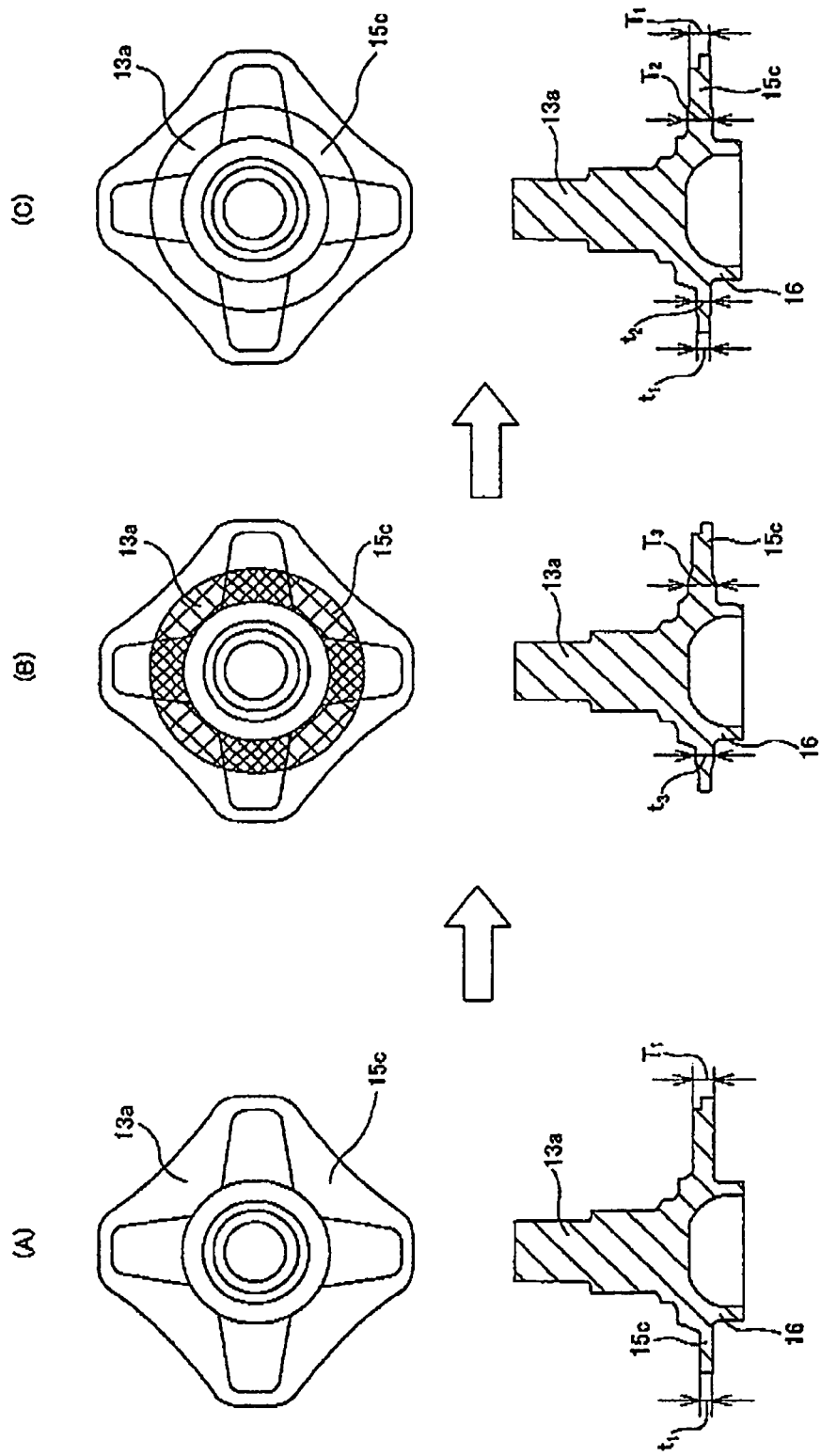
FIG. 16(A) to (C) are cross-section drawings and end views for explaining a fourth example of the finishing processes of a bearing ring member.

In order to obtain a mounting flange 15c having portions with different thicknesses and whose thicknesses at representative portions are $T_1$, $t_1$, and where the portions having the representative thicknesses $T_1$, $t_1$ are not continuous in the circumferential direction (thicknesses alter in the circumferential direction) as shown in (A) of FIG. 16, the thicknesses $T_3$, $t_3$ of the base end sections (end sections on the inner diameter side) of this mounting flange 15c as shown in (B) of FIG. 16 are made to be greater than the thicknesses $T_2$, $t_2$ of the base end sections after completion shown in (C) of FIG. 16 ($T_1 \leq T_2 < T_3$, $t_1 \leq t_2 < t_3$). After process annealing, the base end sections (the hatch sections in the upper portion of (B) of FIG. 16) of the mounting flange 15c are pressed by upsetting to reduce the thickness dimensions of the base end sections to $T_2$, $t_2$, and increase the strength of the base end sections while at the same time maintaining the precision of the dimensions of the base end sections of the mounting flange 15c.

[Fifth Example of the Finishing Process]

Figure 17:
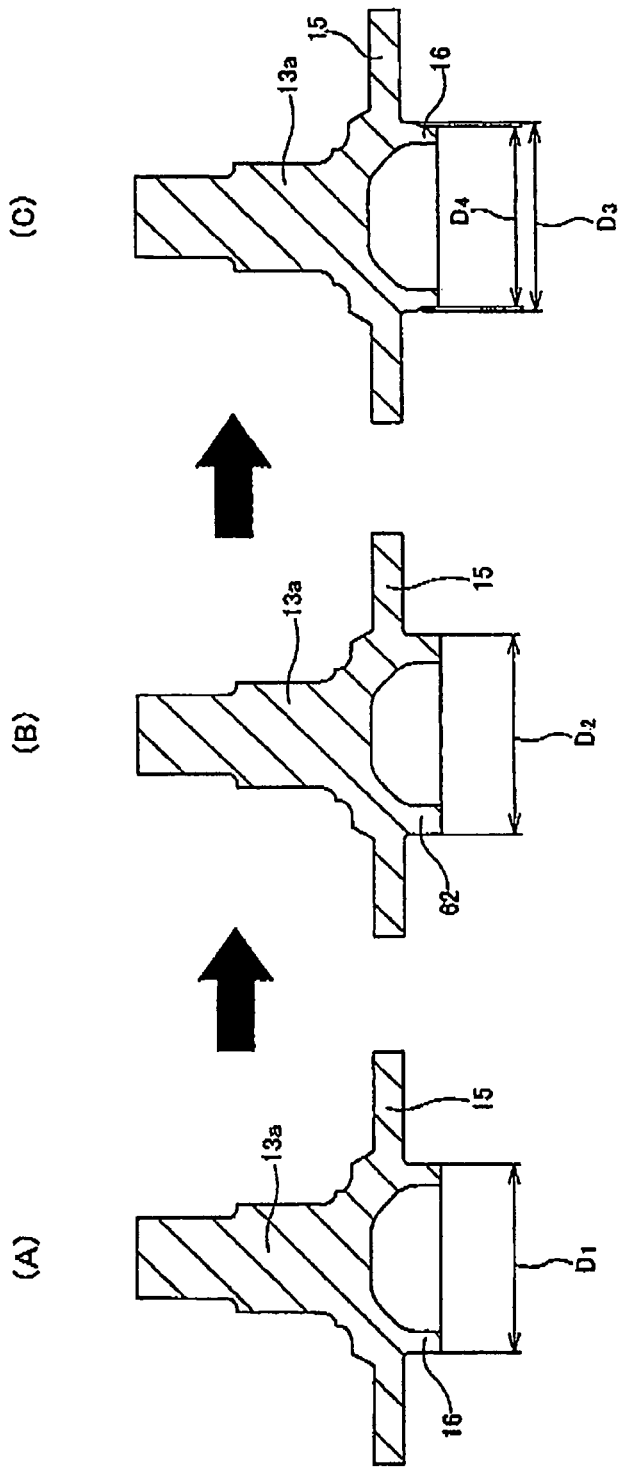
FIG. 17(A) to (C) are cross-section drawings for explaining a fifth example of the finishing processes of a bearing ring member.

In order to bring the outer diameter of the positioning cylinder 16 to the proper value of a diameter $D_1$ as shown in (A) of FIG. 17, cold ironing is performed on a rough cylinder 62 having an outer diameter $D_2$ that is greater than the proper value $D_1$ as shown in (B) of FIG. 17 to reduce the rough cylinder 62 to a diameter $D_3$ ($=D_1$), obtaining a positioning cylinder 16 having the proper diameter as shown in (C) of FIG. 17. The positioning cylinder 16 that is obtained in this way has an outer diameter $D_3$ ($=D_1$) that is the proper value, as well as has sufficient strength that is obtained by work hardening. In the example shown in the figure, the diameter $D_4$ of the tip end section of the positioning cylinder 16 is less than the proper value $D_3$ ($=D_1$), and together with further improving the strength of the tip end of this positioning cylinder 16, it makes it easier to fit the wheel around the outside of the positioning cylinder.

INDUSTRIAL APPLICABILITY

With the present invention, it is possible to manufacture a bearing ring member (hub body of a hub unit for wheel support) of a rolling bearing unit for wheel support that comprises an outward facing flange, a positioning cylinder and step section at low cost and with high precision.

What is claimed is:

1. A process for manufacturing a bearing ring member of a rolling bearing unit for wheel support that comprises an outward facing flange formed around a part of an outer peripheral surface thereof, a positioning cylinder that is formed on one side in an axial direction of the outward facing flange, and a step section that is formed around an outer peripheral surface of a side of the outward facing flange that is opposite in the axial direction from the positioning cylinder and that has a large diameter section on the side of the outward facing flange, and a small diameter section on the far side from the outward facing flange; where in order to manufacture this bearing ring member, a metallic material is prepared that has at least a cylindrical surface section with an outer diameter that matches the outer diameter of the large diameter section of the step section, and without heating this metallic material, a tip end surface of the cylindrical surface section, which is the surface on the opposite side from the outward facing flange, is brought into contact with a receiving punch that has an inner diameter that matches the outer diameter of the small diameter section, and with at least a part of an outer peripheral surface of the cylindrical surface section being supported by an inner peripheral surface of a floating die, which is supported such that it is capable of moving in the axial direction of the cylindrical surface section, it is in a state of having an elastic force applied to it in the direction toward the outward facing flange, and a base end surface of the metallic material, which is the surface on the side opposite the surface that is in contact with the receiving punch, is pressed toward the receiving punch by a pressing punch such that the part of the cylindrical surface section is pressed into the receiving punch to form the small diameter section by cold plastic working.

2. The process for manufacturing a bearing ring member of a rolling bearing unit for wheel support of claim 1, wherein the metallic material is an intermediate material on which the outward facing flange and positioning cylinder are formed beforehand by a forging process, and where the work of pressing the part of cylindrical surface section of this intermediate material by the pressing punch into the receiving punch is performed with the surfaces of the outward facing flange and positioning cylinder being held by a second floating die that is separate from the floating die that holds the outer peripheral surface of the cylindrical surface section and that moves in the axial direction together with this floating die.

3. The process for manufacturing a bearing ring member of a rolling bearing unit for wheel support of claim 1, wherein the metallic material is such that the outward facing flange and positioning cylinder have not yet been formed, and at least a part in the axial direction thereof is a circular column shaped material; and where after this material is formed into an intermediate material by processing a part of the outer peripheral surface into a small diameter section while holding it by a floating die, the outward facing flange and positioning cylinder are formed around the remaining part of the outer peripheral surface of this intermediate material.

4. The process for manufacturing a bearing ring member of a rolling bearing unit for wheel support of claim 1 comprising a flange finishing process for finishing the thickness dimension of the outward facing flange, where in this flange finishing process, the thickness dimension of the outward facing flange is reduced by performing a upsetting process on the outward facing flange to press and plastically deform a section of the outward facing flange that includes a base section in the axial direction.

5. The process for manufacturing a bearing ring member of a rolling bearing unit for wheel support of claim 1 comprising a cylinder finishing process for finishing the outer diameter of the positioning cylinder, where in this cylinder finishing process, the outer diameter of a rough cylinder is reduced to form the positioning cylinder by performing a cold ironing process on this rough cylinder having an outer diameter that is greater than the diameter after finishing.

6. The process for manufacturing a bearing ring member of a rolling bearing unit for wheel support of claim 1 comprising a cylinder finishing process for finishing the inner diameter of the positioning cylinder, where in this cylinder finishing process, the inner diameter of a rough cylinder is increased to form the positioning cylinder by performing a cold ironing process on this rough cylinder having an inner diameter that is less than the diameter after finishing.

7. The process for manufacturing a bearing ring member of a rolling bearing unit for wheel support of claim 2 comprising a flange finishing process for finishing the thickness dimension of the outward facing flange, where in this flange finishing process, the thickness dimension of the outward facing flange is reduced by performing a upsetting process on the outward facing flange to press and plastically deform a section of the outward facing flange that includes a base section in the axial direction.

8. The process for manufacturing a bearing ring member of a rolling bearing unit for wheel support of claim 3 comprising a flange finishing process for finishing the thickness dimension of the outward facing flange, where in this flange finishing process, the thickness dimension of the outward facing flange is reduced by performing a upsetting process on the outward facing flange to press and plastically deform a section of the outward facing flange that includes a base section in the axial direction.

9. The process for manufacturing a bearing ring member of a rolling bearing unit for wheel support of claim 2 comprising a cylinder finishing process for finishing the outer diameter of the positioning cylinder, where in this cylinder finishing process, the outer diameter of a rough cylinder is reduced to form the positioning cylinder by performing a cold ironing process on this rough cylinder having an outer diameter that is greater than the diameter after finishing.

10. The process for manufacturing a bearing ring member of a rolling bearing unit for wheel support of claim 3 comprising a cylinder finishing process for finishing the outer diameter of the positioning cylinder, where in this cylinder finishing process, the outer diameter of a rough cylinder is reduced to form the positioning cylinder by performing a cold ironing process on this rough cylinder having an outer diameter that is greater than the diameter after finishing.

11. The process for manufacturing a bearing ring member of a rolling bearing unit for wheel support of claim 4 comprising a cylinder finishing process for finishing the outer diameter of the positioning cylinder, where in this cylinder finishing process, the outer diameter of a rough cylinder is reduced to form the positioning cylinder by performing a cold ironing process on this rough cylinder having an outer diameter that is greater than the diameter after finishing.

12. The process for manufacturing a bearing ring member of a rolling bearing unit for wheel support of claim 2 comprising a cylinder finishing process for finishing the inner diameter of the positioning cylinder, where in this cylinder finishing process, the inner diameter of a rough cylinder is increased to form the positioning cylinder by performing a cold ironing process on this rough cylinder having an inner diameter that is less than the diameter after finishing.

13. The process for manufacturing a bearing ring member of a rolling bearing unit for wheel support of claim 3 comprising a cylinder finishing process for finishing the inner diameter of the positioning cylinder, where in this cylinder finishing process, the inner diameter of a rough cylinder is increased to form the positioning cylinder by performing a cold ironing process on this rough cylinder having an inner diameter that is less than the diameter after finishing.

14. The process for manufacturing a bearing ring member of a rolling bearing unit for wheel support of claim 4 comprising a cylinder finishing process for finishing the inner diameter of the positioning cylinder, where in this cylinder finishing process, the inner diameter of a rough cylinder is increased to form the positioning cylinder by performing a cold ironing process on this rough cylinder having an inner diameter that is less than the diameter after finishing.

15. The process for manufacturing a bearing ring member of a rolling bearing unit for wheel support of claim 5 comprising a cylinder finishing process for finishing the inner diameter of the positioning cylinder, where in this cylinder finishing process, the inner diameter of a rough cylinder is increased to form the positioning cylinder by performing a cold ironing process on this rough cylinder having an inner diameter that is less than the diameter after finishing.

* * * * *